US011367282B2

(12) United States Patent
Wang

(10) Patent No.: US 11,367,282 B2
(45) Date of Patent: Jun. 21, 2022

(54) SUBTITLE EXTRACTION METHOD AND DEVICE, STORAGE MEDIUM

(71) Applicant: TENCENT TECHNOLOGY (SHENZHEN) COMPANY LIMITED, Shenzhen (CN)

(72) Inventor: Xingxing Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 141 days.

(21) Appl. No.: 16/201,386

(22) Filed: Nov. 27, 2018

(65) Prior Publication Data
US 2019/0114486 A1  Apr. 18, 2019

Related U.S. Application Data

(63) Continuation of application No. PCT/CN2017/096509, filed on Aug. 8, 2017.

(30) Foreign Application Priority Data

Aug. 8, 2016 (CN) .......................... 201610643390.3

(51) Int. Cl.
G06V 20/40 (2022.01)
H04N 21/488 (2011.01)
(Continued)

(52) U.S. Cl.
CPC .............. G06V 20/46 (2022.01); G06T 5/008 (2013.01); G06T 5/30 (2013.01); G06T 5/50 (2013.01);
(Continued)

(58) Field of Classification Search
CPC .. G06K 9/00744; G06K 9/3266; G06T 5/008; G06T 5/30; G06T 5/50;
(Continued)

(56) References Cited

U.S. PATENT DOCUMENTS 5,703,655 A * 12/1997 Corey .................. G11B 27/105
                                                          348/468
6,731,788 B1 * 5/2004 Agnihotri ............ G06K 9/3266
                                                          382/157
(Continued)

FOREIGN PATENT DOCUMENTS

CN   101510260 A   8/2009
CN   102332096 A   1/2012
(Continued)

OTHER PUBLICATIONS

Sang et al. "Rolling and Non-Rolling Subtitle Detection with Temporal and Spatial Analysis for News Video", Jun. 2011, IEEE, Proceedings of 2011 International Conference on Modelling, Identification and Control, p. 285-288. (Year: 2011).*

(Continued)

Primary Examiner — Vincent Rudolph
Assistant Examiner — Timothy Choi
(74) Attorney, Agent, or Firm — Anova Law Group, PLLC

(57) ABSTRACT

A subtitle extraction method includes decoding a video to obtain video frames; performing adjacency operation in a subtitle arrangement direction on pixels in the video frames to obtain adjacency regions in the video frames; and determining certain video frames including a same subtitle based on the adjacency regions, and subtitle regions in the certain video frames including the same subtitle based on distribution positions of the adjacency regions in the video frames including the same subtitle. The method also includes constructing a component tree for at least two channels of the subtitle regions and using the constructed component tree to extract a contrasting extremal region corresponding to each channel; performing color enhancement processing on the contrasting extremal regions of the at least two channels to form a color-enhanced contrasting extremal region; and (Continued)

FIG. 4A extracting the subtitle by merging the color-enhanced contrasting extremal regions of at least two channels.

19 Claims, 12 Drawing Sheets

(51) Int. Cl.
| | | |
|---|---|---|
| *H04N 21/44* | (2011.01) | |
| *G06V 20/62* | (2022.01) | |
| *G06T 5/00* | (2006.01) | |
| *G06T 5/30* | (2006.01) | |
| *G06T 5/50* | (2006.01) | |

(52) U.S. Cl.
CPC .......... *G06V 20/635* (2022.01); *H04N 21/44* (2013.01); *H04N 21/488* (2013.01); *G06T 2207/10016* (2013.01); *G06T 2207/20224* (2013.01)

(58) Field of Classification Search
CPC .......... G06T 2207/10016; G06T 2207/20224; H04N 21/44; H04N 21/488; H04N 21/4884; H04N 13/183; G06V 20/46; G06V 20/635; H04L 51/04
See application file for complete search history.

(56) References Cited

U.S. PATENT DOCUMENTS

| | | | | |
|---|---|---|---|---|
| 2002/0067428 A1* | 6/2002 | Thomsen | ........... | H04N 21/4782 348/465 |
| 2006/0045346 A1* | 3/2006 | Zhou | ......................... | G06T 7/12 382/190 |
| 2009/0013265 A1* | 1/2009 | Cole | ...................... | H04L 51/18 715/758 |
| 2010/0328529 A1* | 12/2010 | Hirayama | ............. | G06K 9/3266 348/452 |
| 2012/0206567 A1* | 8/2012 | Zafarifar | .............. | G06K 9/3266 348/42 |

FOREIGN PATENT DOCUMENTS

| | | |
|---|---|---|
| CN | 102750540 A | 10/2012 |
| CN | 102915438 A | 2/2013 |
| CN | 106254933 A | 12/2016 |

OTHER PUBLICATIONS

Sun et al. "Robust Text Detection in Natural Scene Images by Generalized Color enhanced Contrasting Extremal Region and Neural Networks", Aug. 2014, IEEE, 2014 22nd International Conference on Pattern Recognition, 2715-2720. (Year: 2014).*

Yusufu et al., "A Video Text Detection and Tracking System", Dec. 2013, IEEE, 2013 IEEE International Symposium on Multimedia, p. 522-529. (Year: 2013).*

Sun et al., "A robust approach for text detection from natural scene images", Apr. 16, 2015, Elsevier, Pattern Recognition, vol. 48, p. 2906-2920 (Year: 2015).*

Khodadadi et al., "Text Localization, Extraction and Inpainting in Color Images", May 2012, IEEE, 20th Iranian Conference on Electrical Engineering, p. 1035-1040. (Year: 2012).*

Lim et al., "Text Extraction in MPEG Compressed Video for Content-based Indexing", Sep. 2000, IEEE, Proceedings 15th International Conference on Pattern Recognition, p. 409-412. (Year: 2000).*

Tang et al., "A Spatial-Temporal Approach for Video Caption Detection and Recognition", Jul. 2002, IEEE, IEEE Transactions on Neural Networks, vol. 13, No. 4, p. 961-971. (Year: 2002).*

Zhao et al., "Text From Corners: A Novel Approach to Detect Text and Caption in Videos", Mar. 2011, IEEE, IEEE Transactions on Image Processing, vol. 20, No. 3, p. 790-799. (Year: 2011).*

The World Intellectual Property Organization (WIPO) International Search Report for PCT/CN2017/096509 dated Oct. 27, 2017 5 Pages (including translation).

Sun, Lei, "Robust Text Detection in Natural Scene Images", Electronic Technology & Information Science, China Doctoral Dissertations Full-Text Database, No. 10, Oct. 15, 2015 (Oct. 15, 2015), ISSN: 1674-022X, sections 1.1 and 3.3, pp. 1-113.

* cited by examiner m-connection  Not m-connection

SUBTITLE EXTRACTION METHOD AND DEVICE, STORAGE MEDIUM

RELATED APPLICATIONS

This application is a continuation application of PCT Patent Application No. PCT/CN2017/096509, filed on Aug. 8, 2017, which claims priority to Chinese Patent Application No. 201610643390.3, filed on Aug. 8, 2016, content of all of which is incorporated by reference in its entirety.

FIELD OF TECHNOLOGY

The present disclosure relates to an image processing technology and, in particular, relates to a subtitle extraction method and device, and a storage medium.

BACKGROUND

Currently, subtitles are recorded in video files in a variety of ways, for example, embedded subtitles, internal subtitles, and external subtitles. For the embedded subtitles, the subtitles are superposed on video frames of the video and are integrated with the video frames of the video. No matter how the video format is changed, the size, position, and effect of the subtitles are often unchanged. For the internal subtitles, the video files and subtitle files are encapsulated into at least two audio tracks and at least two subtitle tracks, and the audio and subtitles can be selected during playback. For the external subtitles, the subtitle files corresponding to the external subtitles and the video file are independent from each other and, when the video needs to be played, the to-be-used subtitle file is loaded on the video by a video player.

However, as the video player on a terminal supports the various forms of subtitles, it is difficult to use a unified subtitle extraction method to implement extraction and identification of all forms of subtitles. Thus, during the video playback, it is difficult to automatically extract the subtitles in the text format to be shared by users or to be recorded.

The disclosed methods and systems are directed to solve one or more problems set forth above and other problems.

SUMMARY

The embodiments of the present disclosure provide a subtitle extraction method and device, and a storage medium, and various types of subtitles can be extracted from a video via a unified subtitle extraction manner.

According to one aspect of the present, a subtitle extraction method is provided. The method includes: decoding a video to obtain video frames; and performing adjacency operation in a subtitle arrangement direction on pixels in the video frames to obtain adjacency regions in the video frames. The method also includes determining certain video frames including a same subtitle based on the adjacency regions in the video frames, and subtitle regions in the certain video frames including the same subtitle based on distribution positions of the adjacency regions in the video frames including the same subtitle. The method also includes constructing a component tree for at least two channels of the subtitle regions. The constructed component tree are used to extract a contrasting extremal region corresponding to each channel. The method also includes performing color enhancement processing on the contrasting extremal regions of the at least two channels, to form a color-enhanced contrasting extremal region. The subtitle are extracted by merging the color-enhanced contrasting extremal regions of at least two channels.

According to another aspect of the present disclosure, a subtitle extraction device is provided. The device includes a memory storing computer program instructions, and a processor coupled to the memory. When executing the computer program instructions, the processor is configured to perform: decoding a video to obtain video frames; and performing adjacency operation in a subtitle arrangement direction on pixels in the video frames to obtain adjacency regions in the video frames. The processor is also configured to determine certain video frames including a same subtitle based on the adjacency regions in the video frames, and subtitle regions in the certain video frames including the same subtitle based on distribution positions of the adjacency regions in the video frames including the same subtitle. The processor is also configured to perform: constructing a component tree for at least two channels of the subtitle regions. The constructed component tree is used to extract a contrasting extremal region corresponding to each channel. Color enhancement processing is performed on the contrasting extremal regions of the at least two channels, to form a color-enhanced contrasting extremal region. The subtitle is extracted by merging the color-enhanced contrasting extremal regions of at least two channels.

According to another aspect of the present disclosure, a non-transitory computer-readable storage medium is provided. The non-transitory computer-readable storage medium stores computer program instructions executable by at least one processor to perform: decoding a video to obtain video frames; and performing adjacency operation in a subtitle arrangement direction on pixels in the video frames to obtain adjacency regions in the video frames. The computer program instructions also cause the at least one processor to perform: determining certain video frames including a same subtitle based on the adjacency regions in the video frames, and subtitle regions in the certain video frames including the same subtitle based on distribution positions of the adjacency regions in the video frames including the same subtitle. The computer program instructions also cause the at least one processor to perform: constructing a component tree for at least two channels of the subtitle regions, and using the constructed component tree to extract a contrasting extremal region corresponding to each channel. The computer program instructions also cause the at least one processor to perform: performing color enhancement processing on the contrasting extremal regions of the at least two channels, to form a color-enhanced contrasting extremal region; and extracting the subtitle by merging the color-enhanced contrasting extremal regions of at least two channels.

Other aspects of the present disclosure can be understood by those skilled in the art in light of the description, the claims, and the drawings of the present disclosure.

DETAILED DESCRIPTION

The following further describes the present disclosure in detail with reference to the accompanying drawings. It should be understood that the embodiments provided herein are only used to explain the present disclosure and are not used to limit the present disclosure. In addition, the disclosed embodiments are some but not all of the embodiments of the present disclosure. Other embodiments derived by a person skilled in the art without creative efforts by combining the technical solutions of the disclosed embodiments shall fall within the protection scope of the present disclosure.

It should be noted that, in the embodiments of the present disclosure, the terms "include", "contain", or any other variants thereof are intended to cover non-exclusive inclusions, so that a method or device including a series of elements not only includes the expressly recorded elements, but also include other elements that are not specified expressly, or elements that are inherent to the implementation of methods or devices. Unless otherwise specified, an element limited by "include a/an . . . " does not exclude other related elements existing in the method or the device that includes the element (e.g. a step in a method or a unit in a device).

The following explains certain phrases and terms used in embodiments of the present disclosure.

1) Grayscale value: an integer number representing the degree of brightness of a pixel. For example, if the grayscale value of the pixels of an image is in the range of 0-255, the image is referred to as a 256-grayscale-level image.

2) Erode: deleting certain pixels at the boundary of an object and having an image contraction function. The eroding algorithm uses an n×n-structure element to scan each pixel in the image, and uses a binary image covered by the n×n-structure element and the n×n-structure element to perform an "AND" operation, if both are 1, the pixel of the image is 1, otherwise it is 0. After eroding, the image boundary contracts inwards.

3) Dilate: adding some pixels to the object boundary and having the effect of enlarging the image. The dilation algorithm uses an n×n-structure element to scan each pixel in the image, and an "AND" operation is performed via the binary image covered by the n×n-structure element and the n×n-structure element. If both are 0, the pixel of the image is 0, otherwise it is 1. After dilation, the image boundary is enlarged outwards.

4) Neighboring: If two pixels are in contact, then they are neighboring. A pixel is in contact with a pixel of its neighbor. Neighboring only considers the spatial relationship among pixels.

Figure 1A:
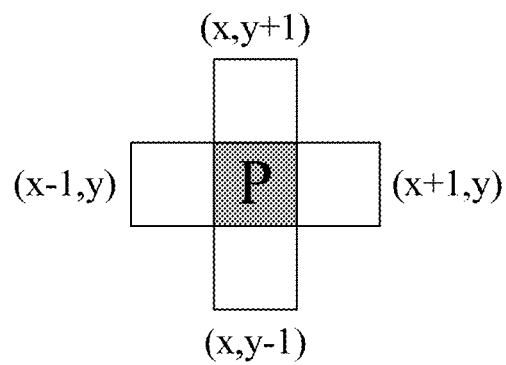
FIG. 1A is a schematic diagram of a pixel relationship according to an embodiment of the present disclosure.

Neighbors include the following types:

4.1) 4-Neighbors: As shown in FIG. 1A, the 4-Neighbors of the pixel p(x, y) is a neighboring pixel: (x+1, y); (x−1, y); (x, y+1); (x, y−1).

Figure 1B:
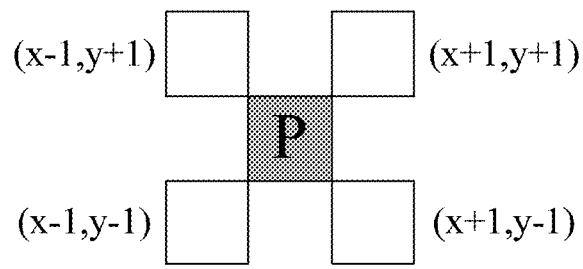
FIG. 1B is a schematic diagram of another pixel relationship according to an embodiment of the present disclosure.

4.2) D-Neighbors: As shown in FIG. 1B, the D-Neighbors of the pixel p(x, y) is a diagonal pixel (x+1, y+1); the ND(p) is used for representing D-Neighbors of the pixel p: (x+1, y−1); (x−1, y+1); (x−1, y−1).

Figure 1C:
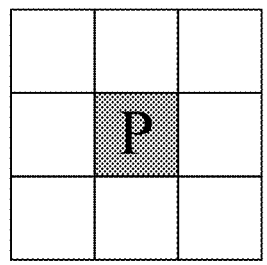
FIG. 1C is a schematic diagram of another pixel relationship according to an embodiment of the present disclosure.

4.3) 8-Neighbors: As shown in FIG. 1C, the 8-Neighbors of pixel p(x, y) is: 4-Neighbors pixel+D-Neighbors pixel, and N8(p) represents the 8-Neighbors of the pixel p.

5) Adjacency, two pixels are connected if they are (1) are neighbors; and (2) Grayscale values (or other attributes) satisfy certain criterion of similarity (conditions of grayscale being equal or being in a certain set).

Adjacency includes the following types:

5.1) 4-Adjacency

Figure 1D:
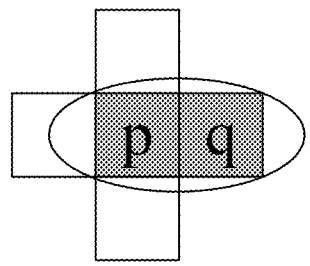
FIG. 1D is a schematic diagram of another pixel relationship according to an embodiment of the present disclosure.

As shown in FIG. 1D, for pixels p and q having a grayscale value V, if q is in the set N4(p), the two pixels are referred to as 4-adjacency.

5.2) 8-Adjacency

Figure 1E:
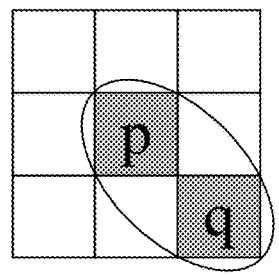
FIG. 1E is a schematic diagram of another pixel relationship according to an embodiment of the present disclosure.

As shown in FIG. 1E, for pixels p and q having a value V, if q is in the set N8(p), the two pixels are referred to as 8-adjacency.

Figure 1F:
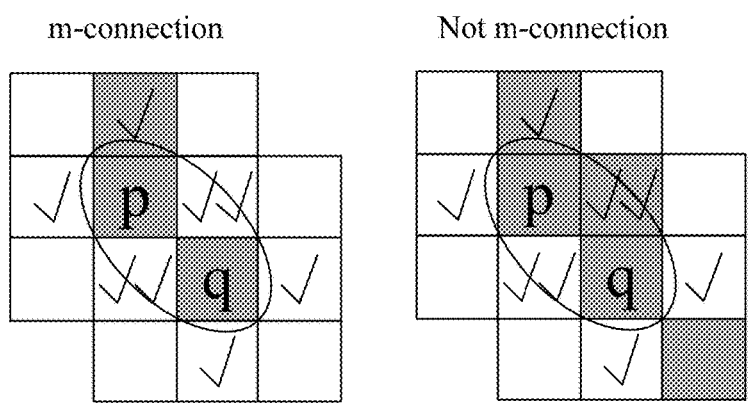
FIG. 1F is a schematic diagram of another pixel relationship according to an embodiment of the present disclosure.

As shown in FIG. 1F, for pixels p and q having a grayscale value V, if:

I. q is in the set N4(p), or,

II. q is in the set ND(p), and the intersection of N4(p) and N4(q) is empty (no pixels with a grayscale value V), then the pixels p and q are m-adjacency, i.e., a mixed adjacency of 4-adjacency and D-adjacency.

6) Adjacency region or connected region, pixels connected (in any of above adjacency/connectivity manners) with each other form a region, and non-connected pixels form different regions. Such a set of pixels which all are connected to each other is referred to as an adjacency region.

7) Data distribution centralization trend feature, that is the field where numbers in an array are centrally distributed. Usually, the distribution situation is determined by using a mode method, a median method, and a mean method, etc. The mode method is used for measuring and calculating the number with the most repeated occurrence times (mode) in an array. The median method is used for measuring and calculating the medial value (median) in the array. The mean method is used for measuring and calculating the mean value of numbers in the array.

8) Inter-frame difference method (frame difference method), subtracting the grayscale value of a pixel of a video frame from the grayscale value of a pixel of the neighboring video frame, in the case where the ambient brightness has no obvious change, if the corresponding pixel grayscale difference is small (not exceeding the threshold value), it can be considered that the object represented by the pixels is stationary; if the grayscale at a certain part of the image region changes a lot (exceeding the threshold value), it can be considered that this is caused by the movement of the object in the image, and these stationary regions and moving pixel regions are marked. Using these marked pixel regions, the positions of the moving object and the stationary object in the video frame can be obtained.

Illustratively, the frame difference method is that a moving object region in the video frame is extracted by adopting pixel-based time difference between two or three neighboring frames in a continuous image sequence, and performing thresholding. The moving object real-time tracking system uses three-frame difference to perform moving target detection. This method not only improves the speed of moving object detection, but also improves the integrity of the detected video frames.

9) Scale-Invariant Feature Transform (SIFT) feature matching algorithm, used for detecting local features in a video frame, that is, the features of feature points of some local appearance of an object. The features of the feature points have no relation to the size and rotation of an image of the object.

Feature points are searched in the spatial scale and feature descriptions of feature points are extracted: position, scale, and rotation invariants. Based on the description of features of feature points obtained by different video frames, matching of feature points can determine whether the video frames include the same feature points.

The feature points found by the SIFT feature matching algorithm are the points which are very prominent and will not change due to factors such as illumination, affine transformation, and noise, such as angular points, edge points, bright points in a dark region, and dark points in a bright region.

10) Contrasting Extremal Region (CER), a region, having a certain contrast (exceeding the contrast threshold) with a surrounding background, in the video frame, perceivable by human eyes at least.

11) Color-enhanced CER, adopting color information in a Perception-based Illumination Invariant (PII) color space to enhance CER, and using color information to filter out redundant pixels or noise in a CER, so as to obtain the Color-enhanced CER. The color space has the consistency of visual perception, is insensitive to light, and is closer to the judgment of human eyes on colors. The color model of the PII color space includes: tone H, saturation S, and lightness V.

The embodiments of the present disclosure provide a subtitle extraction method, a subtitle extraction device applying a subtitle extraction method, and a storage medium (for storing executable instructions for performing the subtitle extraction method).

The subtitle extraction device provided by the embodiments of the present disclosure may be implemented in various forms. For example, the subtitle extraction device may be implemented as a mobile terminal, such as an intelligent phone, a tablet computer, and a vehicle terminal, may also be implemented as a fixed terminal, such as a desktop computer, an intelligent television, and a set-top box, or a similar computing device, or a network-side server.

Figure 2:
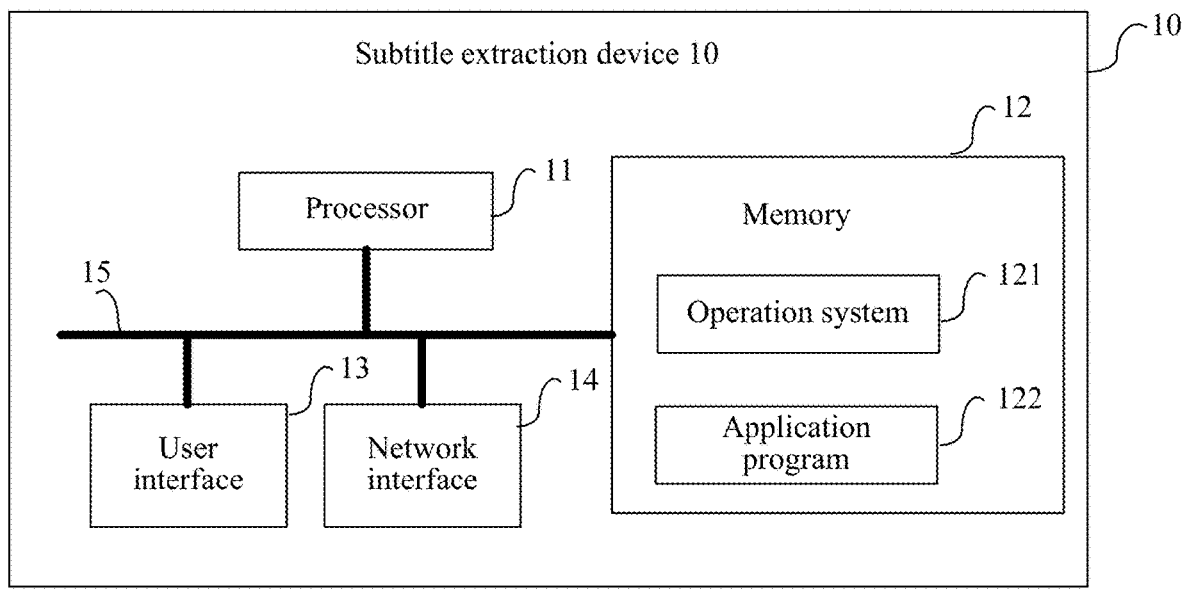
FIG. 2 is a hardware structure schematic diagram of a subtitle extraction device according to an embodiment of the present disclosure.

Illustratively, FIG. 2 shows a hardware structure schematic diagram of the subtitle extraction device 10, and the hardware structure shown in FIG. 2 is only an example and does not constitute a limitation to the device structure. For example, more components than those shown in FIG. 2 may be set according to implementation needs, or some components may be omitted according to implementation needs.

As shown in FIG. 2, a hardware structure of the subtitle extraction device 10 includes at least one processor 11, a memory 12, at least one network interface 14, and a user interface 13. The various components in the subtitle extraction device 10 are coupled together via a bus system 15. It can be understood that, the bus system 15 is used for implementing the connection communication among these components. In addition to a data bus, the bus system 15 also includes a power bus, a control bus, and a status signal bus. However, for the sake of clarity, various buses are marked as bus system 15 in FIG. 2.

The user interface 13 may include a display, a keyboard, a mouse, a trackball, a click wheel, a key, a button, a touch board, a touch screen, etc.

The network interface 14 provides a processor 11 with access to external data such as a remotely located memory 12, illustratively, the network interface 14 may perform near-field communication, based on a Near Field Communication (NFC) technology, a Bluetooth technology, and a ZigBee technology. In addition, communication systems based on such as code division multiple access (CDMA) and wideband code division multiple access (WCDMA) and their evolution systems can also be implemented.

It will be understood that memory 12 may be a volatile memory or a nonvolatile memory, and may also include both a volatile memory and a nonvolatile memory. Wherein, the nonvolatile memory may be a Read Only Memory (ROM), Programmable Read-Only Memory (PROM), Erasable Programmable Read-Only Memory (EPROM), Electrically Erasable Programmable Read-Only Memory (EEPROM), ferromagnetic random access memory (FRAM), Flash Memory, magnetic surface memory, optical disk, or Compact Disc Read-Only Memory (CD-ROM); the magnetic surface memory may be a magnetic tape memory. The volatile memory may be a Random Access Memory (RAM), which serves as an external high-speed buffer memory. By way of illustrative but non-limiting illustration, various types of RAMs can be used, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), and Direct Rambus Random Access Memory (DRRAM). Memory 12 described by embodiment of the present disclosure is intended to include, but is not limited to, these and any other suitable types of memories.

The memory 12 in the embodiment of the present disclosure is configured to store various types of data, to support the operation of the subtitle extraction device 10. Examples of such data include any computer program for operating on the subtitle extraction device 10, such as an operation system 121 and an application program 122; contact person data; phone book data; messages; pictures; and videos. Among them, the operation system 121 includes various system programs, such as a framework layer, a core library layer, and a driver layer, for implementing various basic services and processing hardware-based tasks. The application 122 may include various application programs such as a Media Player and a Browser, for implementing various application services. The program for implementing the method of the embodiment of the present disclosure may be included in the application 122.

The above method disclosed in the embodiments of the present disclosure may be applied to the processor 11 or implemented by the processor 11. The processor 11 may be an integrated circuit chip with signal processing capabilities. In the implementation process, each step of the above method may be completed by an integrated logic circuit of hardware in the processor 11 or an instruction in the form of software. The processor 11 described above may be a general-purpose processor, a Digital Signal Processor (DSP), or other programmable logic devices, a discrete gate or transistor logic device, a discrete hardware component, etc. The processor 11 may implement or execute the methods, steps, and logic blocks disclosed in the embodiments of the present disclosure. A general-purpose processor may be a microprocessor or any conventional processor, etc. The steps of the methods disclosed in the embodiments of the present disclosure may be directly implemented by a hardware decoding processor, or may be implemented by a combination of hardware and software modules in a decoding processor. The software module may be located in a storage medium, the storage medium is located in the memory 12, and the processor 11 reads the information in the memory 12 and combines the hardware to complete the steps of the above method.

In an exemplary embodiment, the subtitle extraction device 10 can be implemented by one or at least two Application Specific Integrated Circuits (ASICs), DSPs, Programmable Logic Devices (PLDs), Complex Programmable Logic Devices (CPLDs), a Field-Programmable Gate Arrays (FPGAs), general processors, controllers, Micro Controller Units (MCUs), microprocessors, or other electronic elements, for executing the forgoing method.

Figure 3:
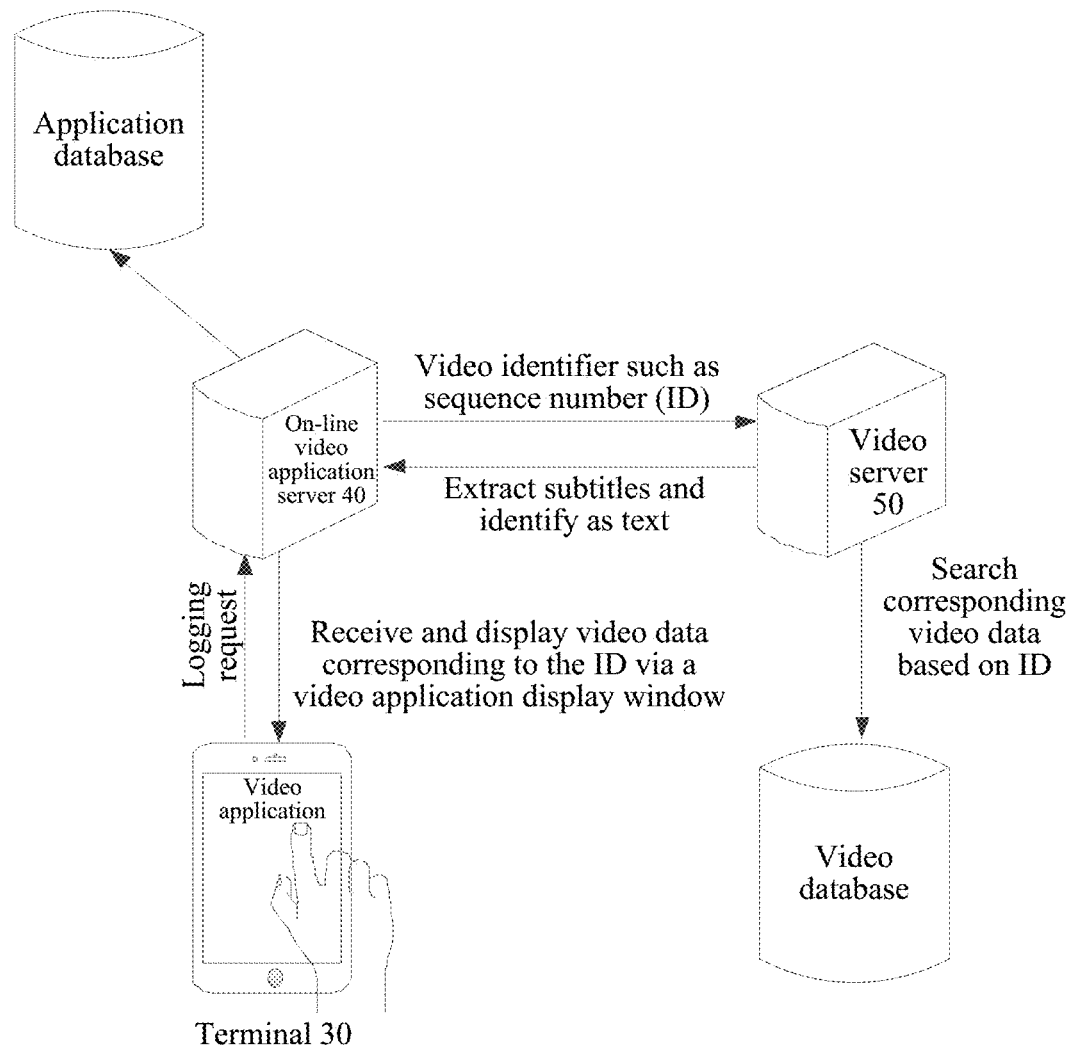
FIG. 3 is a scene schematic diagram of subtitle extraction according to an embodiment of the present disclosure.

With reference to a scene schematic figure of subtitle extraction shown in FIG. 3, a terminal 30 issues a video application login request to run, on an online video application server 40, an online video-play application. According to an identifier such as a sequence number (ID) of the video selected by a user in an online video-play application, video data is requested from a video server 50. The video server 50 obtains the video from a video database, and extracts the subtitle region from the video and recognizes in a text format, which is sent, together with the video, by an online video application server 40 to the terminal 30.

As an alternative solution to extract subtitles from the video when the video is delivered to the terminal, the video server 50 may in advance recognize the subtitles in the text format from the video of the video database, and the subtitles are stored in the video database together with the video. Thus, when concurrently responding to at least two terminals for requesting videos (for example, the terminal 30 requests subtitles of different videos, or requests subtitles of the same video), subtitles in the text format may be sent in real time to avoid delay.

Of course, the video server 50 may only send the data of the video requested by the terminal 30 to the corresponding terminal for playing. When the terminal 30 needs the subtitle in the text format in the video, the corresponding subtitle in the text format is sent to the terminal 30.

Illustratively, the video data of streaming media may be transmitted in Realtime Streaming or Progressive Streaming manner among the terminal 30, the online video application server 40, and the video server 50. Generally speaking, if the video needs to be played in real time, a streaming media server is used or Real Time Streaming Protocol (RTSP) is applied for transmission. If a hypertext transfer protocol (HTTP) server is used, the video data of streaming media are sent through progressive streaming. Which transmission method is adopted depends on the demand for real-time video playing. Of course, the terminal 30 may also download all the data of the video to the local and then play it.

Figure 4A:
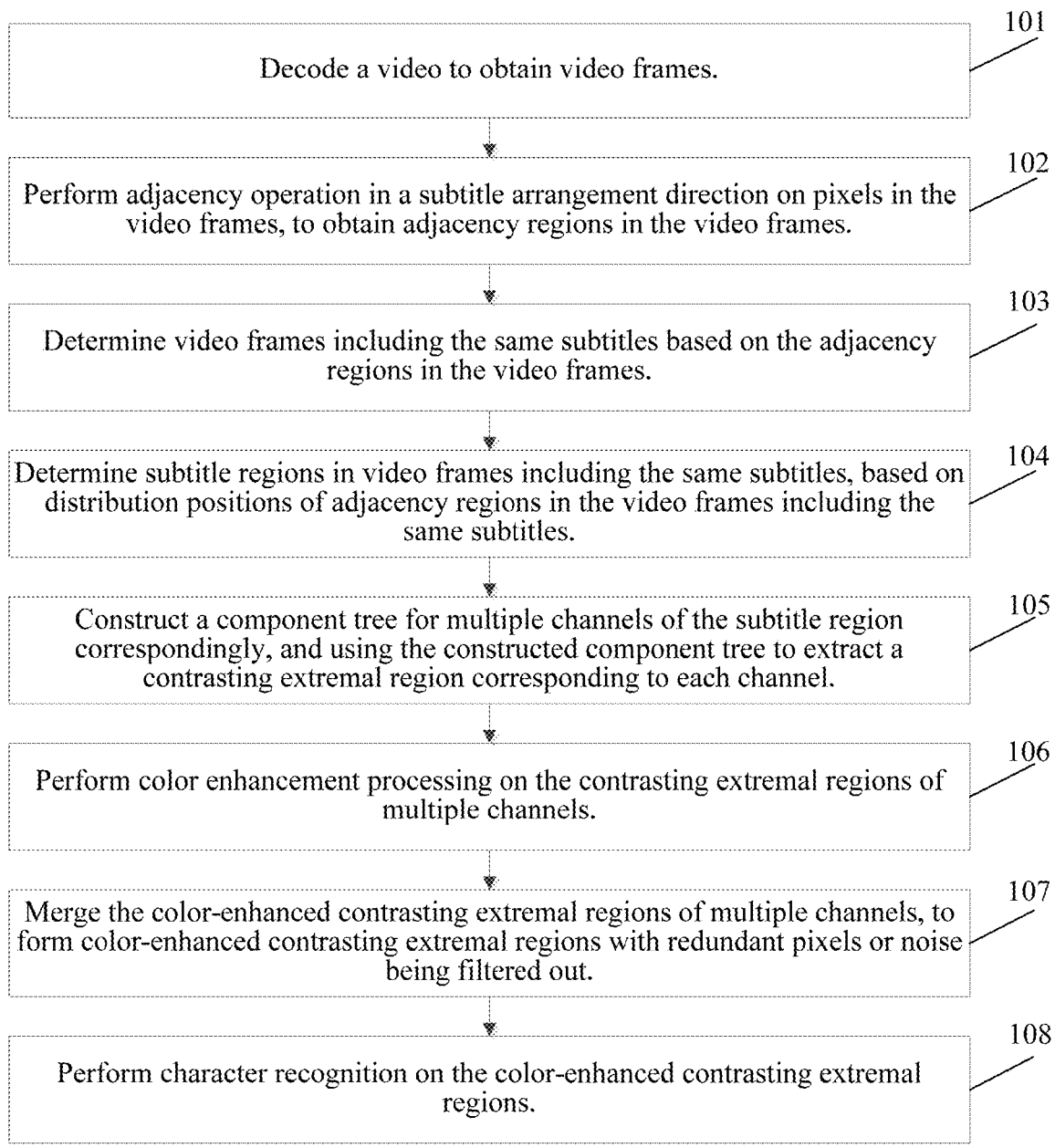
FIG. 4A is a flowchart schematic diagram of a subtitle extraction method according to an embodiment of the present disclosure.

A flow diagram shown in FIG. 4A that can be applied to the subtitle extraction in FIG. 3 is described below. As shown in FIG. 4A, the method includes the followings.

Step 101: Decoding the video to obtain video frames.

Step 102: Performing an adjacency or connection operation in a subtitle arrangement direction on pixels in the video frames, to obtain adjacency regions in the video frames.

In one embodiment, the video frames at different time points are sampled according to the duration of the video. For example, the video frames at different time points are correspondingly extracted based on the frame rate of the video. In order to avoid missing the subtitles in a certain video frame, the sampling rate for extracting the video is larger than the frame rate of the video. Eroding and dilation operations are performed on the pixels in the extracted video frames, and an adjacency operation in a subtitle arrangement direction is performed on the video frames subjected to the eroding and dilation operations. Usually, the subtitles are arranged in the video in a left-to-right direction. Therefore, the pixels in the video frames are subjected to leftward and rightward adjacency operations, to enable the characters in the subtitle region in the video frame to form an adjacency region. Of course, if it is known in advance that the arrangement direction of the subtitles in the video is different from the conventional arrangement direction, the adjacency operation may be performed pointedly on the subtitle arrangement direction of the video.

Step 103: Determining video frames including the same subtitles based on the adjacency regions in the video frames.

In one embodiment, a difference value between the pixels of the adjacency regions (the adjacency region corresponding to the subtitle in text format) in the extracted neighboring video frames is obtained, for example, a difference among different channels in an RGB space, or a difference value among different channels in a PII space. When the difference value is higher than a difference threshold, it may indicate that the difference value between pixels in the adjacency regions in the neighboring video frames is too high. If the subtitles of the adjacency regions in neighboring video frames are same, the difference value between pixels must be less (lower than a difference threshold), thus, it is determined that the extracted neighboring video frames include the same subtitles. When the difference value is higher than the difference threshold, it is determined that the extracted neighboring video frames include different subtitles.

In one embodiment, for adjacency regions in the extracted time-neighboring video frames, feature points are extracted from corresponding adjacency regions based on a Scale-Invariant Feature Transform feature matching algorithm. The extracted feature points have the characteristics of not change due to position, scale and rotation and, therefore, if the subtitles in the neighboring video frames are the same, the feature points extracted from the adjacency regions in the neighboring video frames are necessarily matched. Correspondingly, whether the neighboring video frames include the same subtitles can be determined by determining whether the feature points of the adjacency regions in neighboring video frames are matched.

In addition, the above two methods for determining whether the neighboring video frames include the same subtitles can be used in combination, to further improve the accuracy of identifying the video frames including different subtitles. For example, when a difference value between the pixels of the adjacency regions in the extracted neighboring video frames is obtained and the difference value is lower than a difference threshold, and when feature points are extracted from the corresponding adjacency regions based on a Scale-Invariant Feature Transform feature matching algorithm and the feature points extracted from the adjacency regions in the neighboring video frames are matched, it is determined that the extracted neighboring video frames include the same subtitles. Otherwise, it is determined that the extracted neighboring video frames include different subtitles.

Step 104: Determining subtitle regions in video frames including the same subtitles, based on distribution positions of adjacency regions in the video frames including the same subtitles.

In one embodiment, for distribution positions of adjacency regions in video frames including the same subtitles (the distribution position refers to a distribution position of an edge region of the adjacency region), the distribution centering trend characteristic of the corresponding distribution positions is determined. For example, the distribution trend characteristic of the distribution positions is determined based on a mode method, a median method, and a mean method.

Taking the mode method as an example, based on the occurrence times of the distribution position of the adjacency region in each of the video frames including the same subtitles, the region formed by the distribution position having the highest occurrence times (that is, the region where the distribution position is the edge position) is determined as the subtitle region. Taking the median method as an example, based on the distribution position of the adjacency region in each video frame including the same subtitles, the region formed by the distribution position of a medial value (that is, the region where the distribution position is the edge position) is determined as the subtitle region. Taking the mean method as an example, based on the distribution positions of adjacency regions in video frames including the same subtitles, the region formed by a mean value of the distribution positions (that is, the region where the mean value of the distribution positions is the edge position) is determined as the subtitle region.

Step 105: Constructing a component tree for at least two channels of the subtitle region correspondingly, and use the constructed component tree to extract a contrasting extremal region corresponding to each channel.

In one embodiment, from at least two channels such as a grayscale image, a PII tone channel, and a PII saturation channel, a component tree formed by the nested nodes is correspondingly constructed for the subtitle region of a video frame. The nodes of the component tree correspond to characters of the subtitle region; the contrast between the node and the neighboring background is represented by the area-change-rate of the node relative to the neighboring node. Since the extremal region and the neighboring background have the contrast that at least can be perceived by human eyes, when the area-change-rate of the node relative to the neighboring node is less than an area-change-rate threshold, it is determined that the node belongs to the contrasting extremal region of a corresponding channel.

Step 106: Performing color enhancement processing on the contrasting extremal regions of at least two channels.

In one embodiment, for each channel's contrasting extremal region, the main color of the contrasting extremal region is determined, and pixels whose similarity degree with the main color satisfies preset conditions are extracted from the contrasting extremal region. Based on the extracted pixels, the color-enhanced contrasting extremal region of a corresponding channel is formed.

For example, for the subtitle region of any channel, the pixels in the subtitle region are sorted according to the grayscale values in a descending order. The set of pixels having grayscale values ranked in top predetermined ratio is taken, if a color distance between the pixels in the set and the main color of the set is less than a color distance threshold (the color distance threshold is the minimum color distance when human eyes can perceive the difference in colors), then a color-enhanced contrasting extremal region is formed based on the pixels.

Step 107: Merging the color-enhanced contrasting extremal regions of at least two channels, to form color-enhanced contrasting extremal regions with redundant pixels or noise being filtered out.

Through color enhancement processing and merging, the effects of noise point removal of the subtitle region, and the separation of characters in the subtitle region from the background can be implemented.

As previously described, illustratively, the color-enhanced contrasting extremal regions are merged from at least two of the following channels: a grayscale image; a perception-based Illumination Invariant (PII) tone channel; a PII saturation channel. Since the noise and the background has been filtered out of the color-enhanced contrasting extremal region formed by the image of the subtitle region, the image of the subtitle region can be effectively filtered to eliminate the illumination and clothes strong interference background, so as to better separate the background and the subtitles, for improving the efficiency and accuracy of character recognition.

Step 108: Performing character recognition on the color-enhanced contrasting extremal regions.

Since the noise and background has been filtered out of the image of the color-enhanced contrasting extremal region, the difficulty in character recognition of the image will be significantly reduced, and an appropriate character-recognition technology can be used for performing character recognition on the subtitle region.

Figure 4B:
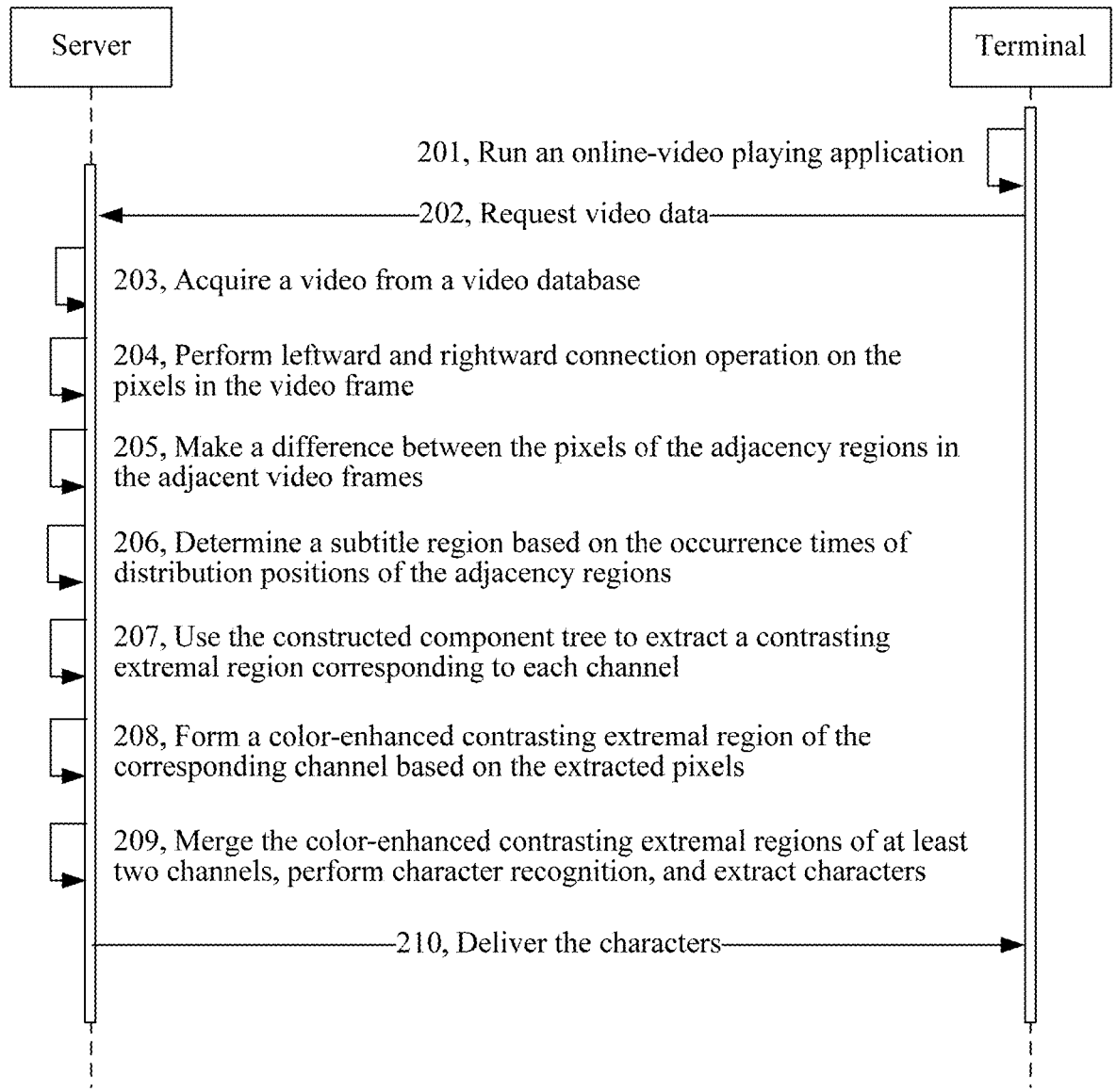
FIG. 4B is a flowchart schematic diagram of another subtitle extraction method according to an embodiment of the present disclosure.

A flow diagram that can be applied to a terminal and a server shown in FIG. 4B is used for description. As shown in FIG. 4B, the following steps are included.

Step 201: The terminal runs an online video-playing application.

Step 202: The terminal requests from a server video data according to a video identifier such as a serial number (ID) selected by a user in the online video-playing application.

Step 203: The server obtains a video from a video database based on the video identifier such as a serial number (ID).

Step 204: The server decodes the video to obtain video frames, and performs leftward and rightward adjacency operations on the pixels in the video frames to obtain adjacency regions in the video frames;

Step 205: The server obtains a difference value between the pixels of the adjacency regions (the adjacency region corresponding to the subtitles in text format) in the extracted neighboring video frames. When the difference value is smaller than a difference threshold, the server determines that the extracted neighboring video frames include the same subtitles.

Step 206: The server determines the region formed by the distribution position with the most occurrence times to be the subtitle region, based on the occurrence times of the distribution position of the adjacency region in each of the video frames including the same subtitles.

Step 207: The server constructs a component tree for at least two channels of the subtitle region, and uses the constructed component tree to extract a contrasting extremal region corresponding to each channel.

Step 208: The server determines the main color of the contrasting extremal region of each channel by the server, extracts pixels whose similarity degree with the main color satisfies preset conditions, from the contrast degree extremal region, to form a color-enhanced contrasting extremal region of the corresponding channel, based on the extracted pixels.

Step 209: The server merges the color-enhanced contrasting extremal regions of at least two channels, to form a color-enhanced contrasting extremal region with redundant pixels and noise being filtered out, and performs character recognition on the color-enhanced contrasting extremal region to extract subtitle characters.

Step 210: The server sends the subtitle characters to the terminal.

It should be noted that, in this example, steps 204 to 206 are the process of locating subtitles in a video, and steps 207 to 209 are the process of extracting the located subtitles from a complex background.

According to the subtitle extraction method provided by the embodiments of the present disclosure, the server extracts the adjacency region corresponding to subtitles from the video frame, so that for any form of subtitles, the subtitle region (an image corresponding to the adjacency region) can be extracted, regardless of which form of subtitles the video uses. Meanwhile, the contrasting extremal regions extracted from the subtitle regions are subjected to color enhancement processing and merging, to effectively filter the image of the subtitle region to eliminate the illumination and clothes strong interference background, so as to better separate the background and subtitles, which is desired for improving the efficiency and accuracy of subsequent text recognition.

For example, the following further explains the subtitle extraction.

The process of positioning the subtitle location from video files with complex backgrounds and extracting clean subtitle images mainly includes two parts of processing. The first part is the positioning of the subtitles in the video, and the second is the extraction of the located subtitles from the complex background.

Video subtitle positioning: extracting video frames at different time points according to the duration of the video, performing morphological eroding and dilation on these video frames, and combining leftward and rightward adjacency region operations to obtain the subtitle region of the video frame. Further, performing the above positioning operation on the video frames at different time, to obtain the positions of a series of subtitle regions in the video, and obtaining accurate position information of the subtitle region in the video by the mode method.

Video subtitle extraction: after the completion of video subtitle positioning, the text and background information of the subtitle region need to be separated, and whether the subtitle information in the time domain is the same subtitles is distinguished by the frame difference method and the SIFT feature matching algorithm. If it belongs to the same subtitles, the images of the subtitle region of the same subtitle are superimposed, to obtain the mean value, so as to eliminate the interference of some complicated backgrounds such as lighting and clothes. In addition, color filtering is performed on the mean subtitle region, and the subtitle is found by merging CER (contrasting extremal region) of the subtitle region of multiple channels. Finally, an image of a final clean subtitle region image is obtained by the color-enhanced CER.

A hardware environment of the video server 50 in FIG. 3 is as follows:

CPU: Genuine Intel®@1.73 GHz or above;
Memory: 1 GB or more;
Hard disk: more than 120 GB.

A software operating environment of the video server 50 in FIG. 3 is as follows:

Operating System: 64 bit tlinux, version 1.2 or above
Database: redis and mysql

The processing procedure for subtitle extraction by the video server 50 using the above hardware environment and software environment is described in the followings.

I. Subtitle Region Positioning

Figure 5A:
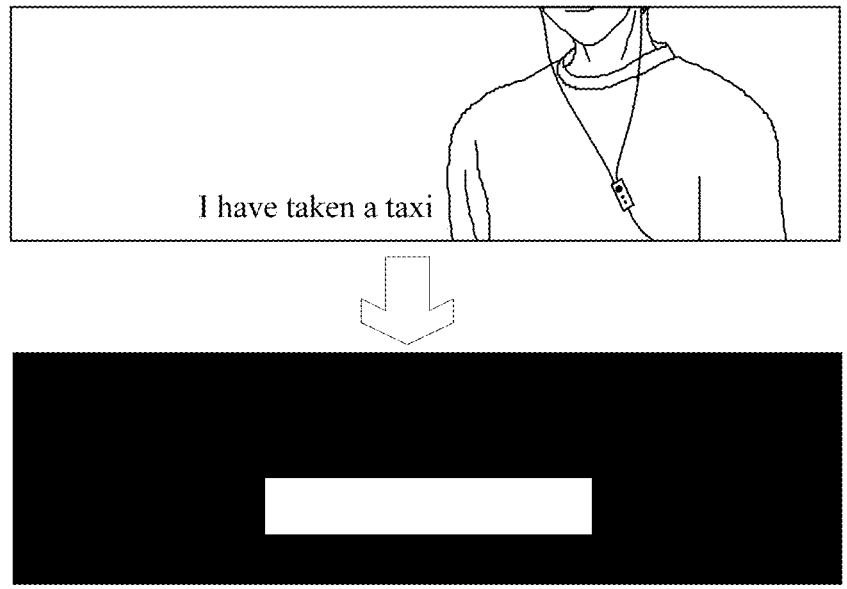
FIG. 5A is a schematic diagram of a subtitle region according to an embodiment of the present disclosure.
Figure 5B:
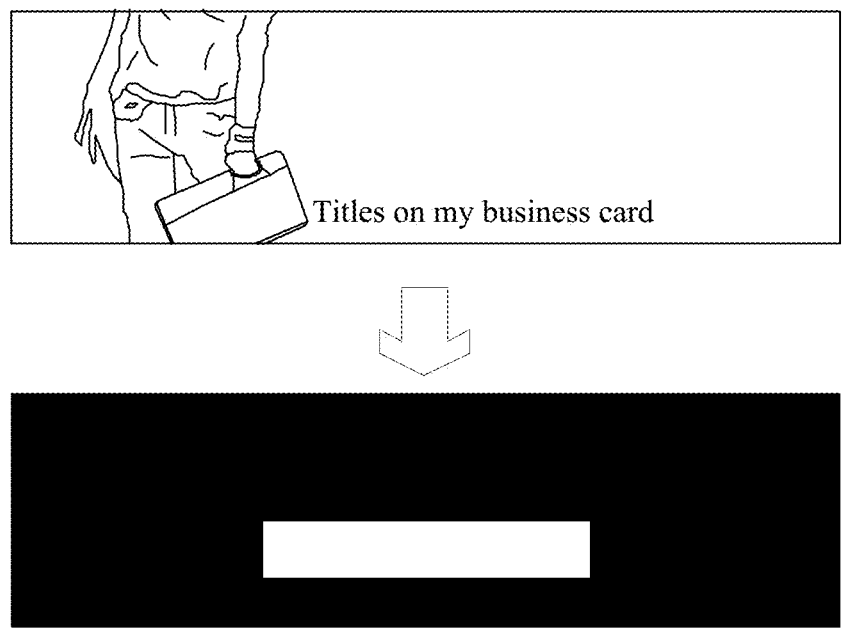
FIG. 5B is a schematic diagram of another subtitle region according to an embodiment of the present disclosure.

The video is decoded to obtain video frames, and the image of a video frame is subjected to eroding and dilation operations. Then the left and right combined operation is performed to obtain a subtitle target region of each frame. The N frames of image are taken at different time points for the same video, to locate the subtitle region. Finally, the final text line height is obtained by calculating a mode of all (x1, y1), (x2, y2) coordinates. FIGS. 5A and 5B show schematic diagrams of the original image of the video frame and after the subtitle region positioning in the video frame.

After locating the subtitle region in the video frame, namely the upper and lower borders of the subtitle text line, in order to eliminate the interference of strong illumination, clothing, etc., during the text separation process, the frame difference in the video time domain and the SIFT feature matching are used to distinguish whether the subtitles in two video frames are the same subtitles.

Figure 6:
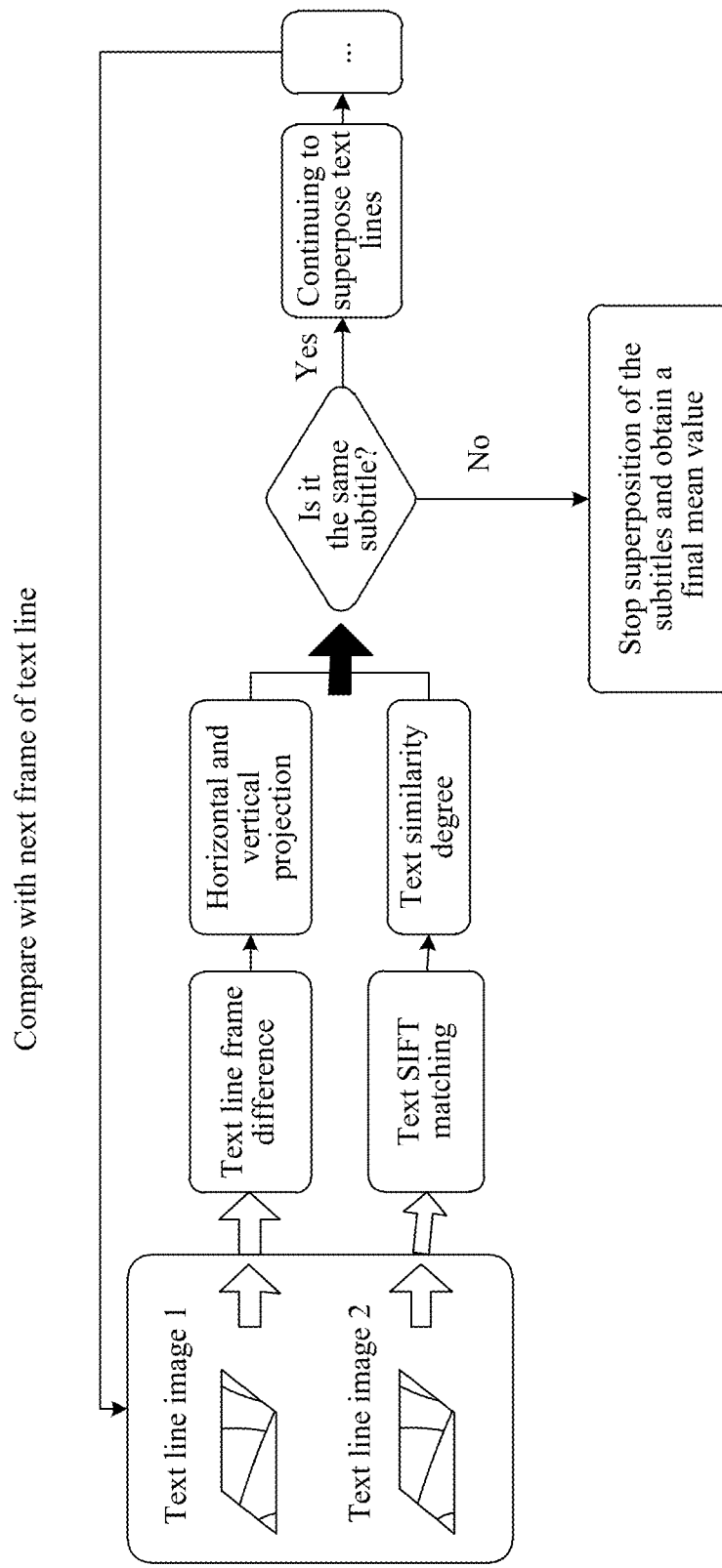
FIG. 6 is a flow schematic diagram of subtitle region superposition according to an embodiment of the present disclosure.

A flow diagram for judging whether two video frames include the same subtitles by using the frame difference method is shown in FIG. 6. The subtitle regions in the video frames continuously extracted from the video are recorded as a text line image 1 and a text line image 2. The two modes are combined to determine whether the text line image 1 and the text line image 2 are the same subtitles:

Mode 1: Comparing pixel differences of neighboring text lines, according to horizontal projection and vertical projection (usually for binary images, the horizontal projection is the number of non-zero pixel values per line, here is 1 or 255, and vertical projection is the number of non-zero pixel values in each column of image data), and determining whether the text line image 1 and the text line image 2 are the same subtitles.

Mode 2: Extracting the SIFT features of the text line image 1 and the text line image 2 to match and obtain a similarity degree based on a matching result, and combining the results of the frame difference method and the similarity degree of the SIFT features, to comprehensively determine whether the same subtitles are used. If the subtitles are the same, the text line image 1 and the text line image 2 are superimposed and averaged to form a new text line image.

The above-mentioned determination process is repeated for the subtitle regions in the subsequently-extracted video frames and the new text line image, to continue to superimpose the same text line images, until the text line image in the extracted video frame changes. For the new text line image, superimpose processing is continued.

II. Subtitle Extraction

For the text line image (subtitle region) formed by each subtitle, a component tree is constructed and the CER region is extracted.

Figure 7:
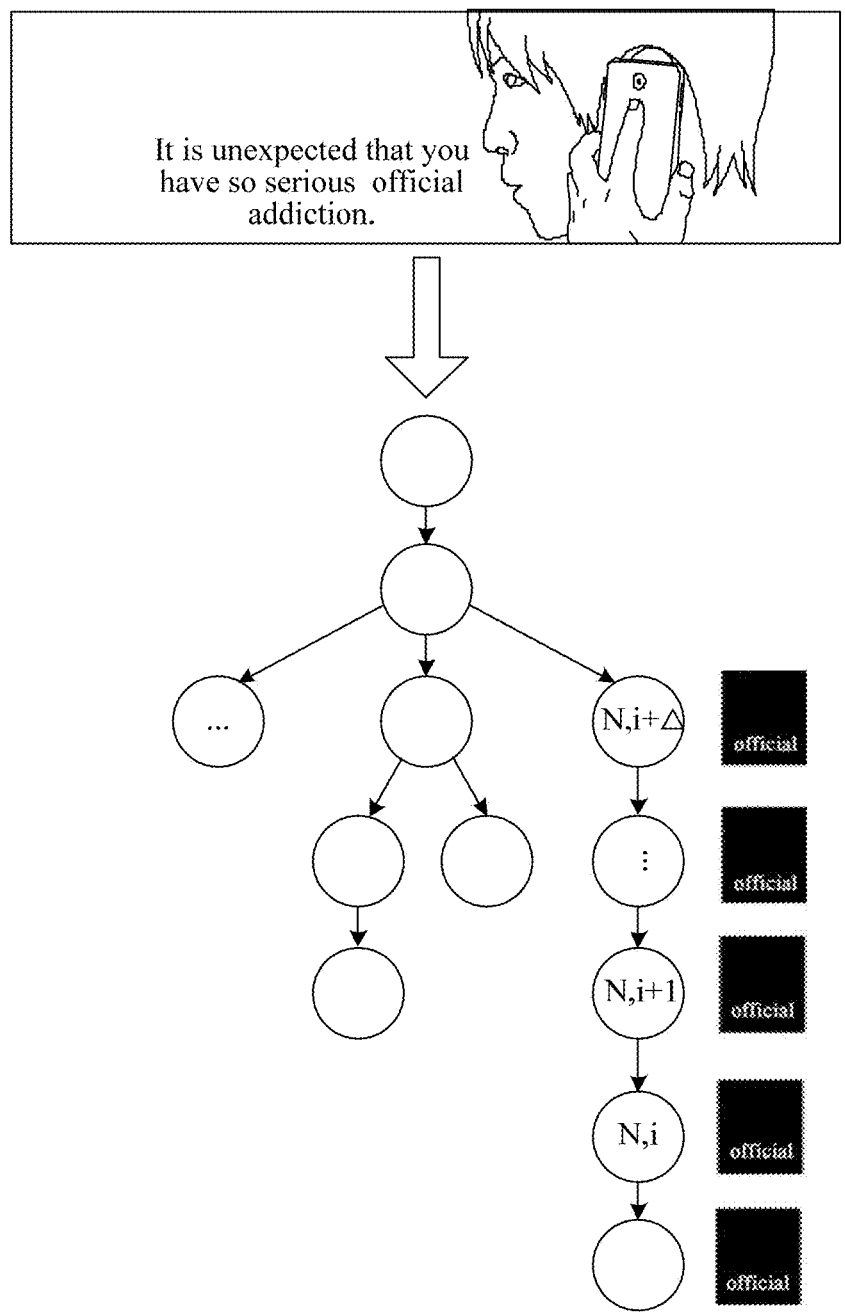
FIG. 7 is a schematic diagram of forming a contrasting extremal region according to an embodiment of the present disclosure.

FIG. 7 shows a component tree construction flow chart.

Referring to a structure diagram of the component tree shown in FIG. 7, (N, i), (N, i+1), . . . , are a series of nodes/extremal regions corresponding to Chinese characters "guan" (represented by S) and are nested in order from bottom to top on the component tree. Let S(N, i), S(N, i+1), . . . , represent the areas of (N, i), (N, i+1), . . . , respectively, then area-change-rate between the node (N, i) and its ancestor node (N, i+Δ) is:

$$R_{\Delta S}(n_i, n_{i+\Delta}) = \frac{Sn_{i+\Delta} - Sn_i}{Sn_i} \quad (1)$$

The area-change-rate $R_{\Delta S}(n_i,n_{i+\Delta})$ can be used for measuring the contrast between the node (N, i) with its neighboring background. It is assumed that a binarization threshold corresponding to a certain extremal region in the image of the subtitle region is level, when the threshold is reduced, the extremal region will be dilated outwards or merged with other extremal regions, accordingly, the area is increased, and $R_{\Delta S}(n_i,n_{i+\Delta})$ is used for describing the area growth rate. If the contrast between the extremal region and its neighboring background is high, the area of its outward dilation will be smaller, and the area growth rate will be slower. Therefore, $R_{\Delta S}(n_i,n_{i+\Delta})$ is in inverse ratio to the contrast degree between the node n and its neighboring background. The greater $R_{\Delta S}(n_i,n_{i+\Delta})$ is, the lower the contrast is. Based on the area-change-rate, the contrasting extremal region (CER) can be defined as follows.

If $R_{\Delta S}(n_i,n_{i+\Delta}) < T_{R_{\Delta S}}$ ($T_{R_{\Delta S}}$ being a constant), then the node $n_i$ is a CER.

Although the definition of CER is very simple, it has a clear physical meaning: it is a special type of extremal region. These extremal regions and their neighboring backgrounds have the contrast that at least can be perceived by the human eyes. The strictness of CER extraction conditions depends on the parameters Δ and $T_{R_{\Delta S}}$. For example, if the parameter Δ is fixed, the larger $T_{R_{\Delta S}}$ is, the lower the contrast requirement for the CER is, that is, the lower-contrast extremal region can be extracted, so more CERs are extracted. In actual natural scene images, it is true that some text regions have low contrast. In order to deal with these situations, it is necessary to set Δ and $T_{R_{\Delta S}}$ to be more conservatively, that is, the requirement for the minimum contrast of CER is very low. In the embodiment of the present disclosure, the above-mentioned parameters are set based on the visual perception of human eyes. The principle is that the minimum contrast of the CER can be perceived by human eyes. Through experiments, Δ and $T_{R_{\Delta S}}$ are set to be 3 and 0.5, respectively. Usually, the number of CERs extracted from the component tree is much less than the number of nodes in the original component tree. For example, for a megapixel image, the number of the extracted CERs is usually only a few hundred to several thousand.

Usually, there are more noises in video subtitles, and the situation that backgrounds and text are merged together often occurs. Therefore, it is also necessary to construct a component tree for at least two channels of the subtitle region correspondingly, the constructed component tree is used for extracting the CER corresponding to each channel, CERs of at least two channels are merged, and the merged CERs of at least two channels are subjected to color enhancement processing, to filter out redundant pixels or noise in the CER as much as possible. The enhancement algorithm mainly includes two steps: 1) estimating the main color of the CER; and 2) extracting pixels with color similar to the main color from CER, to form color-enhanced CER.

In general, noise pixels are located at the edge of the CER, so their grayscale values are small. Therefore, in order to estimate the main color of a certain CER (recorded as CERc), the pixels included in the CERc may be sorted according to the size of the grayscale values in a descending order. Let $S_{med}$ represent a set in which pixels having grayscale values ranked in top 50% in the CERc, $N_{p_i}$ is the number of pixels in the set, $N_{p_i}$ is the color of pixel $p_i$, $F_{dc}$ is the main color of the CERc, and $F_{dc}$ can be calculated as:

$$F_{dc} = \frac{1}{N_{pi}} \sum_{pi \in Smed} F_{pi} \quad (2)$$

The fact that the pixel $p_i$ and the main color $F_{dc}$ are similar can be defined as: if the color distance $d(N_{p_i}, F_{dc}) < T_{dc}$ ($T_{dc}$ is a constant), it can be said that $N_{p_i}$ has the color similar to $F_{dc}$. The minimum similarity degree between $N_{p_i}$ and $F_{dc}$ is described here, and based on human eye perception and experimentation, $T^{dc}$ is set to be $\sqrt{300}$.

In order to allow more text in the image to satisfy the definition of the extremal region, CERs are extracted on multiple channels (a grayscale image, a PII H-channel, a PII S-channel), and finally the extracted CER regions are merged, to finally achieve the separation of text from a complex background.

Figure 8:
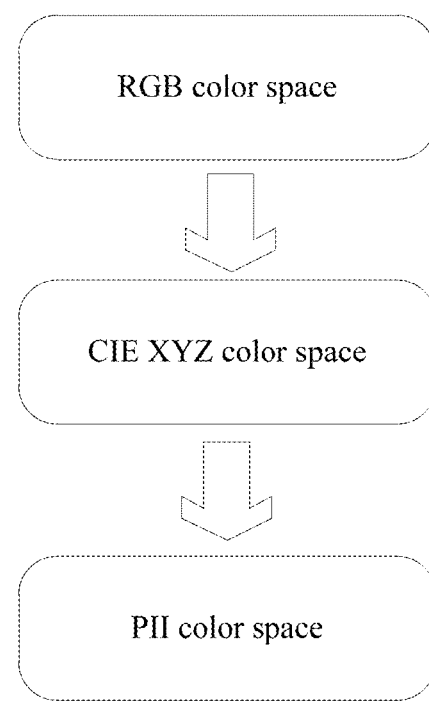
FIG. 8 is a schematic diagram of color space conversion according to an embodiment of the present disclosure.

The merging of CERs extracted from at least two channels involves color space changes, which will be described below with reference to a schematic diagram of color space conversion shown in FIG. 8.

The following is conversion of RGB color space to PII color space. Let the vector $(R_{rgb},G_{rgb},B_{rgb})$ represent a certain color in the RGB color space, and the value range of $(R_{rgb}, G_{rgb},B_{rgb})$ is 0 to 1. If the value range of $(R_{rgb},G_{rgb}, B_{rgb})$ is not 0 to 1, it should be linearly normalized to the interval of 0 to 1. Then $(R_{rgb},G_{rgb},B_{rgb})$ is subjected to conversion as follows:

$$C_{linear} = \begin{cases} \frac{C_{rgb}}{12.92}, & C_{rgb} \leq 0.05045 \\ \left(\frac{C_{rgb}+a}{1+a}\right)^{2.4}, & C_{rgb} \leq 0.05045 \end{cases} \quad (3)$$

Here, C represents the final linear conversion to $(R_{rgb}, G_{rgb},B_{rgb})$:

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_{linear} \\ G_{linear} \\ B_{linear} \end{bmatrix} \quad (4)$$

Thus, the value (X,Y,Z) of $(R_{rgb},G_{rgb},B_{rgb})$ in CIE XYZ color space is obtained.

Then, let $\vec{x}=(X,Y,Z)$ represent tristimulus values in CIE XYZ space. Let $F(\vec{X})$ represent a transformational equation from CIE XYZ space to PII color space. The derivation process of $F(\vec{X})$ can then be summarized as follows: when colors are projected onto certain specific basis vectors, the effect of adding light to the color is equivalent to multiplying each color channel by a scalar factor. Here, a linear transformation to a specific base is represented by a matrix B. The effect of lighting on the color can be written as follows:

$$\vec{x} \to B^{-1}DB\vec{x} \qquad (5)$$

Here, D is a diagonal matrix only related to lighting. A following equation can be obtained:

$$F(\vec{x})-F(\vec{x}')=F(B^{-1}DB\vec{x})-F(B^{-1}DB\vec{x}') \qquad (6)$$

The vision distance between any two colors fin PII space can be defined as:

$$d(\vec{x},\vec{x}')=\|F(\vec{x})-F(\vec{x}')\| \qquad (7)$$

Here, symbol $\|\cdot\|$ represents a Euclidean distance.

Via derivation, it can be proved that $F(\vec{X})$ must have the following form:

$$F(\vec{x})=A(l\,\hat{n}\,(B\vec{x})) \qquad (8)$$

Wherein, A matrix is obtained by training:

$$B = \begin{bmatrix} 2.71 \times 10 & -2.28 \times 10 & -1.81 \\ -5.65 & -7.72 & 1.29 \times 10 \\ -4.16 & -4.58 & -4.58 \end{bmatrix} \qquad (9)$$

Wherein, B matrix is obtained by training:

$$B = \begin{bmatrix} 9.47 \times 10^{-1} & -2.95 \times 10^{-1} & -1.31 \times 10^{-1} \\ -1.18 \times 10^{-1} & 9.93 \times 10^{-1} & 7.37 \times 10^{-1} \\ 9.23 \times 10^{-2} & -4.65 \times 10^{-2} & 9.95 \times 10^{-1} \end{bmatrix} \qquad (10)$$

Thus, given any color vector, $(R_{rgb}, G_{rgb}, B_{rgb})$, in the RGB color space, it is first converted into CIE XYZ color space by equations (3) and (4), and then it is converted into PII color space by equation (6).

It can be seen that the subtitle extraction program based on the above can extract any type of subtitles in the video, to perform character recognition, which is described illustratively in conjunction with following application scenes.

Figure 9A:
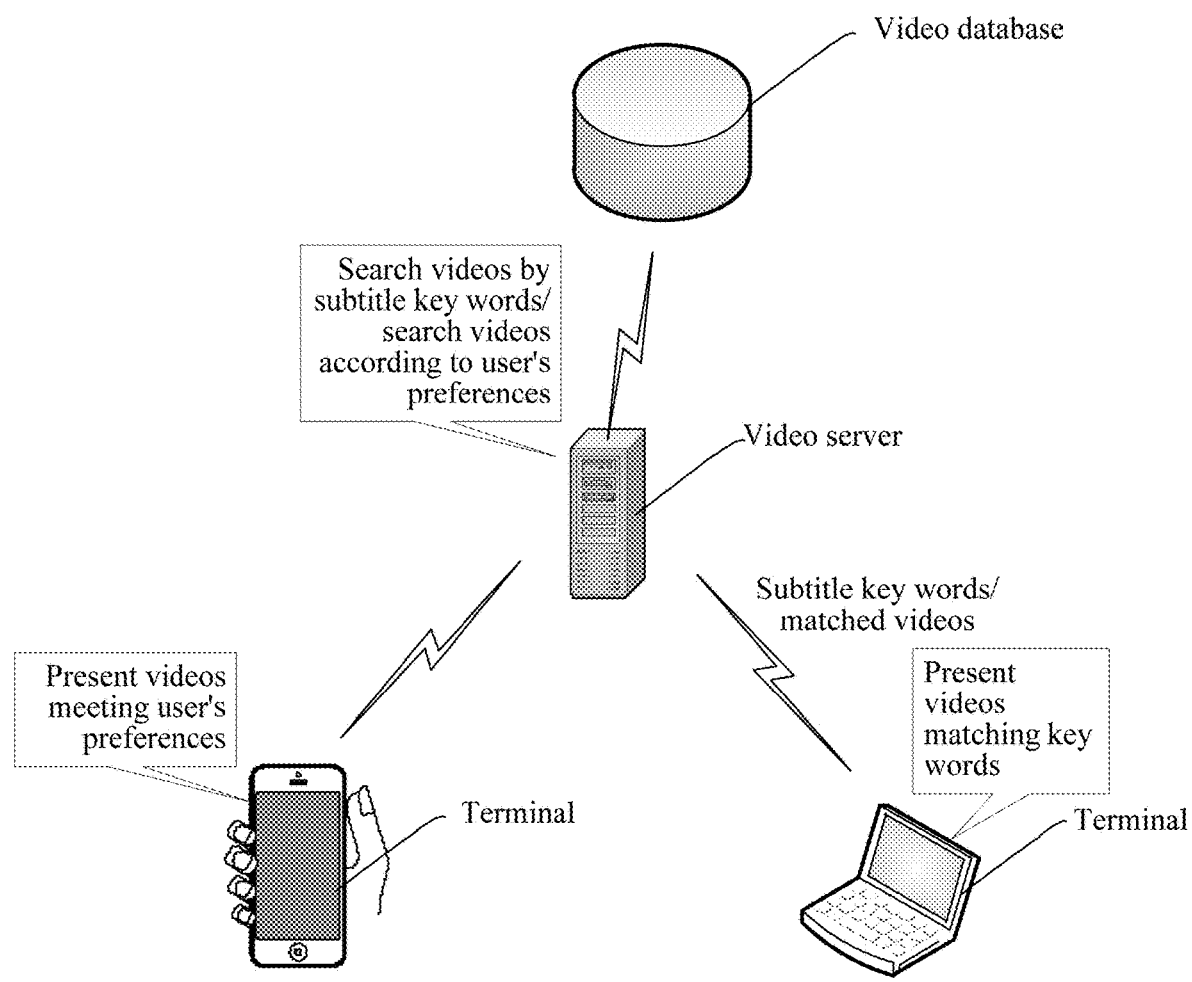
FIG. 9A is a scene schematic diagram of subtitle extraction according to an embodiment of the present disclosure.

For example, in an application scene subtitle extraction shown in FIG. 9A, after the video subtitles are extracted, character recognition is performed, the subtitles in text format are analyzed to determine the type, attributes, etc., of the video, and the user's preferences are analyzed. With the accumulation of the number of the videos watched by a user, a preference database of the user can be established, for recommending new online videos to the user according to the user's preferences.

For another example, a content index database of the videos is created according to the subtitles in text format of the videos. According to key words inputted by users, the video with contents matching the key words is searched, to overcome the defects that the related technology can search only based on the type and name of the video.

Figure 9B:
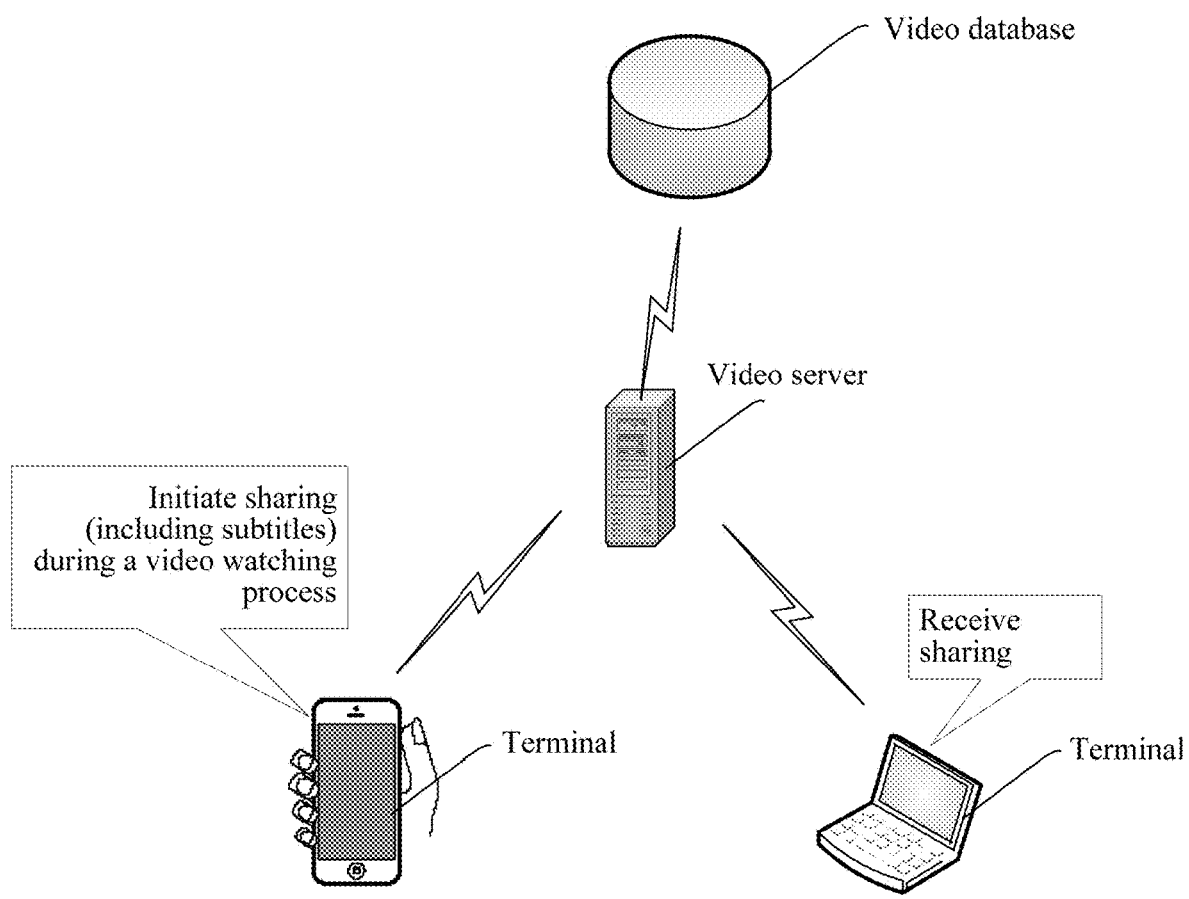
FIG. 9B is another scene schematic diagram of subtitle extraction according to an embodiment of the present disclosure.

In another application scene of subtitle extraction shown in FIG. 9B, a function of sharing while watching while for a video is provided. While watching the video, a user can use a one-click identification function, to extract the subtitles of a current video playing interface and identify the subtitles as a text format to be automatically filled in a dialogue frame to share instant messages, so as to improve the fluency and automation degree of a sharing operation.

A logical function structure of the foregoing subtitle extraction device is described. Referring to a logical function structure schematic diagram of the subtitle extraction device shown in the figure, it should be noted that, the illustrated logical function structure of the subtitle extraction device is only an example. Based on the logical function structure shown in the figure, those skilled in the art can further combine or split the units therein, thereby making variations and improvements to the logical function structure of the subtitle extraction device.

Figure 10:
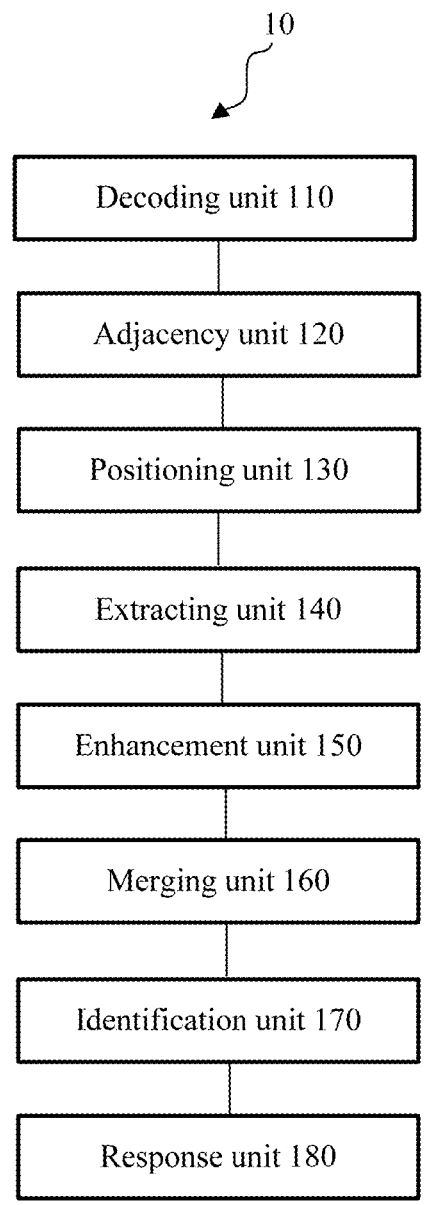
FIG. 10 is a function structure schematic diagram of a subtitle extraction device according to an embodiment of the present disclosure.

In FIG. 10, the subtitle extraction device includes a decoding unit 110, an adjacency unit 120, a positioning unit 130, an extracting unit 140, an enhancement unit 150, and a merging unit 160.

The decoding unit 110 is configured to decode a video to obtain video frames. The adjacency unit 120 is configured to perform an adjacency operation in a subtitle arrangement direction on the pixels in the video frames to obtain adjacency regions in the video frames. The positioning unit 130 is configured to determine video frames including the same subtitles based on adjacency regions in the video frames, and determine the subtitle regions in the video frames including the same subtitles, based on distribution positions of the adjacency regions in the video frames including the same subtitles.

The extracting unit 140 is configured to construct a component tree for at least two channels of the subtitle region correspondingly, and extract the contrasting extremal region corresponding to each channel by using the constructed component tree. The enhancement unit 150 is configured to perform color enhancement processing on the merged contrasting extremal regions of at least two channels, to form a color-enhanced contrasting extremal region with redundant pixels and noise being filtered out. The merging unit 160 is configured to extract subtitles by merging the contrasting extremal regions of at least two channels.

In one embodiment, the adjacency unit 120 is further configured to extract video frames at different time points, according to the duration of the video, perform eroding and dilation operations on the extracted video frames, and perform leftward and rightward adjacency operations on the video frames subjected to the eroding and dilation operations.

For example, the adjacency unit 120 samples video frames at different time points according to the duration of the video. For example, video frames at different time points are extracted based on the frame rate of the video. In order to avoid missing the subtitles in a certain video frame, the sampling rate during video extraction is greater than the frame rate of the video. Eroding and dilation operations are performed on the pixels in the extracted video frames, and an adjacency operation in a subtitle arrangement direction is performed on the video frames subjected to the eroding and dilation operations. Usually, the subtitles are arranged in the video in a left-to-right direction. Therefore, the pixels in the video frame are subjected to leftward and rightward adjacency operations, to enable characters in the subtitle region in the video frame to form an adjacency region. Of course, if it is known in advance that the arrangement direction of the subtitles in the video is different from the conventional arrangement direction, the adjacency operation may be performed pointedly on the subtitle arrangement direction of the video.

In one embodiment, the positioning unit 130 is further configured to obtain a difference value between the pixels of the adjacency regions in the extracted neighboring video frames. When the difference value is less than a difference threshold, it is determined that the extracted neighboring video frames include the same subtitles. When the difference value is higher than a difference threshold, it is determined that the extracted neighboring video frames include different subtitles.

For example, the difference value between the pixels of the adjacency region (adjacency region corresponding to the subtitle in text format) in the extracted neighboring video frames is obtained, for example, a difference value among different channels in an RGB space, or a difference value among different channels in a PII space. When the difference value is higher than a difference threshold, it means that the difference value between pixels in the adjacency regions in the neighboring video frames is too high. If the subtitles of the adjacency regions in neighboring video frames are same, the difference value between pixels must be less (less than a difference threshold), thus, it is determined that the extracted neighboring video frames include the same subtitles. When the difference value is higher than the difference threshold, it is determined that the extracted neighboring video frames include different subtitles.

In one embodiment, the positioning unit 130 is further configured to extract feature points from the adjacency regions in the extracted neighboring video frames. When the feature points extracted from the adjacency regions in the neighboring video frames are matched, it is determined that the extracted neighboring video frames include the same subtitles. When the feature points extracted from the adjacency regions in the neighboring video frames are not matched, it is determined that the extracted neighboring video frames include different subtitles For example, for adjacency regions in the extracted time-neighboring video frames, feature points are extracted from corresponding adjacency regions based on a Scale-Invariant Feature Transform (SIFT) feature matching algorithm. The extracted feature points have the characteristics of not change due to position, scale and rotation, therefore, if the subtitles in the neighboring video frames are the same, the feature points extracted from the adjacency regions in the neighboring video frames are necessarily matched, and correspondingly, whether the neighboring video frames include the same subtitles can be determined by determining whether the feature points of the adjacency regions in neighboring video frames are matched.

In addition, the above two modes for determining whether the neighboring video frames include the same subtitles can be used in combination, to further improve the accuracy of identifying the video frames including different subtitles. For example, when a difference value between the pixels of the adjacency regions in the extracted neighboring video frames is obtained and the difference value is less than a difference threshold, and when feature points are extracted from the corresponding adjacency regions based on a Scale-Invariant Feature Transform (SIFT) feature matching algorithm and the feature points extracted from the adjacency regions in the neighboring video frames are matched, it is determined that the extracted neighboring video frames include the same subtitles; otherwise, it is determined that the extracted neighboring video frames include different subtitles.

In one embodiment, the positioning unit 130 is configured to determine the occurrence times of distribution position of the edge region of the adjacency region in each of the video frames including the same subtitles, and determine that the region formed by the distribution position having the most occurrence times as the subtitle region.

For example, for a distribution position of an adjacency region in each of the video frames including the same subtitles (the distribution position refers to a distribution position of the edge region of the adjacency region), the distribution centering trend characteristic of the corresponding distribution position is determined, for example, the distribution trend characteristic of the distribution position is determined based on a mode method, a median method, and a mean method.

Taking the mode method as an example, based on the occurrence times of the distribution position of the adjacency region in each of the video frames including the same subtitles, the region formed by the distribution position having the highest occurrence times (that is, the region where the distribution position is the edge position) is determined as the subtitle region. Taking the median method as an example, based on the distribution position of the adjacency region in each of the video frames including the same subtitles, the region formed by the distribution position of a medial value (that is, the region where the distribution position is the edge position) is determined as the subtitle region. Taking the mean method as an example, based on the distribution position of the adjacency region in each of the video frames including the same subtitles, the region formed by a mean value of the distribution position (that is, the region where the mean value of the distribution position is the edge position) is determined as the subtitle region.

In one embodiment, the enhancement unit 150 is configured to determine the contrasting extremal region of each channel by adopting the following manner: correspondingly forming a component tree formed by nested nodes, for the subtitle region of the video frame, from the following each channel: a grayscale image; a perception-based Illumination Invariant (PII) tone channel; and a PII saturation channel; wherein the nodes of the component tree correspond to the characters of the subtitle region. When the area-change-rate of the node relative to a neighboring node is less than an area-change-rate threshold, it is determined that the node belongs to the contrasting extremal region of a corresponding channel.

For example, the pixels in the subtitle region are sorted according to the size of the grayscale values in a descending order. The set in which pixels having grayscale values ranked in top predetermined ratio is taken, if the color distance between the pixels in the set and the main color of the set is less than a color distance threshold (the color distance threshold is the minimum color distance when human eyes can perceive the difference in color), then a color-enhanced contrasting extremal region is formed based on the pixels. Through color enhancement processing, the effects of noise removal of the subtitle region, and separation of characters and a background in the subtitle region can be implemented.

In one embodiment, for the contrasting extremal region of each channel, the enhancement unit 150 is configured to form a color-enhanced contrasting extremal region of a corresponding channel by adopting the following process: determining the main color of the contrasting extremal region of each channel; extracting pixels, whose similarity degree with the main color satisfies preset conditions, from the contrasting extremal region of each channel, and forming a color-enhanced contrasting extremal region of the corresponding channel, based on the extracted pixels.

In one embodiment, referring to FIG. 10, the subtitle extraction device 10 further includes an identification unit 170 and a response unit 180.

The identification unit 170 is configured to perform character recognition on a color-enhanced contrasting extremal region; and the response unit 180 is configured to respond to the identified text, to perform at least one of operations including video search, video recommendation, video identifier classification, and subtitle sharing.

For example, after the video subtitles are extracted, character recognition is performed, the subtitles in text format are analyzed to determine the type, attributes, etc., of the video, and the user's preferences are analyzed. With the accumulation of amount of the videos watched by a user, a preference database of the user can be established, for recommending new online videos to the user based on the user's preferences.

For another example, a content index database of the videos is created according to the subtitles in text format of the videos. According to the key words inputted by users, the videos with contents matching the key words is searched, to overcome the defects that the related technology can search only based on the type and name of the video.

For another example, a function of sharing while watching is provided. While watching the video, users can use a one-click identification function, to extract the subtitles of the current video playing interface and identify the subtitles as a text format to be automatically filled in a dialogue frame to share messages of feelings, so as to improve the fluency and automation degree of a sharing operation.

Accordingly, beneficial effects of the embodiments of the present disclosure include the followings.

The adjacency region corresponding to subtitles is extracted from the video frame. Since a potential region (an adjacency region) including the subtitles is extracted from a video frame layer loaded with the subtitles, for any form of subtitles, the subtitle region (an image corresponding to the adjacency region) can be extracted, regardless of which form of subtitles the video uses.

From at least two channels, the contrasting extremal region extracted from the subtitle region is adjusted by means of color enhancement, effectively filtering out noises and backgrounds in the image of the subtitle region, and reducing the difficulty in identifying the character from the subtitle region in subsequence, which is favorable for improving the efficiency and accuracy of subsequent character recognition.

By extracting video subtitles, it is convenient to identify the subtitles later. The identified subtitle information will be used for video personalized recommendation, that is, through analyzing the video subtitles to understand the video attributes, recommendation is performed according to the video content attributes. In addition, extracted video subtitles can be used for video-content-based searching, allowing users to find the video they want.

A person of ordinary skill in the art can understand that, all or part of the steps for implementing the embodiments of above methods can be accomplished by related hardware which is instructed by a program, and the foregoing program can be stored in a computer-readable storage medium. When the program is executed, the steps of the embodiments of the above methods are executed. The foregoing storage media include: a mobile storage device, a random access memory (RAM), a read-only memory (ROM), a magnetic disk, an optical disk, and other media that can store program codes.

Or, the above-mentioned integrated unit of the present disclosure may also be stored in a computer-readable storage medium, if it is implemented in the form of a software function module and sold or used as an independent product. Based on such understanding, the technical solution of the embodiments of the present disclosure essentially or partially (the part that contributes to the related technology) may be embodied in the form of a software product, and the software product is stored in a storage medium and includes instructions to make a computer device (which may be a personal computer, a server, or a network device, etc.) perform all or part of the methods described in the various embodiments of the present disclosure. The foregoing storage media include: a mobile storage device, a RAM, an ROM, a magnetic disk, or an optical disk, and other media that can store program codes.

The foregoing description is merely specific implementation manners of the present disclosure, but the protection scope of the present disclosure is not limited thereto. Variations or substitutions easily found by any person skilled in the art in the technical scope disclosed by the present disclosure should all fall within the protection scope of the present disclosure. Therefore, the protection scope of the present disclosure should be subjected to the protection scope of the claims.

What is claimed is:

1. A subtitle extraction method, comprising:

decoding a video to obtain video frames;

performing adjacency operation in a subtitle arrangement direction on pixels in the video frames to obtain adjacency regions in the video frames;

determining certain video frames include a same subtitle based on the adjacency regions in the video frames, wherein the step of determining includes:

conducting a mode 1 of obtaining a difference value between pixels of the adjacency regions in the certain video frames;

conducting a mode 2 of extracting feature points from the adjacency regions in the certain video frames via a scale-invariant feature transform (SIFT) algorithm; and combining the mode 1 and the mode 2 such that upon determining the difference value between the pixels of the adjacency regions is less than a difference threshold and that the feature points extracted from the adjacency regions are matched, determining the certain video frames include the same subtitle;

after determining the certain video frames include the same subtitle, superimposing subtitle regions of the certain video frames including the same subtitle and averaging the subtitle regions as superimposed to form a new subtitle region, wherein the subtitle regions are averaged to obtain a mean value as the new subtitle region;

constructing a component tree for at least two channels of the new subtitle region in the certain video frames, and using the constructed component tree to extract contrasting extremal regions respectively corresponding to the at least two channels, wherein the component tree includes a series of nodes nested in order from bottom to top, and an area-change-rate $R_{\Delta S}$ between a node (N, i) and an ancestor node (N, i+$\Delta$) is represented by formula $$R_{\Delta S}(n_i, n_{i+\Delta}) = \frac{Sn_{i+\Delta} - Sn_i}{Sn_i},$$

$Sn_i$ represents an area of the node (N, i), $Sn_{i+\Delta}$ represents an area of the ancestor node (N, i), and the contrasting extremal regions are extracted according to the area-change-rate $R_{AS}$, wherein the node (N, i) and the ancestor node (N, i+$\Delta$) of the component tree correspond to characters of the new subtitle region, and upon determining the area-change-rate $R_{AS}$ is less than an area-change rate threshold, the node (N, i) is determined to belong to the contrasting extremal regions of the at least two channels;

performing color enhancement processing on the contrasting extremal regions of the at least two channels to form color-enhanced contrasting extremal regions; and extracting the same subtitle by merging the color-enhanced contrasting extremal regions of the at least two channels.

2. The method according to claim 1, wherein the performing adjacency operation on the pixels in the video frames to obtain the adjacency regions in the video frames includes:

extracting the video frames at different time points according to a duration of the video;

performing eroding and dilation treatment on the video frames as extracted to obtain treated video frames; and performing leftward and rightward adjacency operations on the treated video frame to obtain the adjacency regions.

3. The method according to claim 1, wherein determining the adjacency regions in the certain video frames including the same subtitle includes:

in each of the video frames including the same subtitle, determining occurrence times of different distribution positions of an edge region of an adjacency region, respectively, and determining that a region formed by a distribution position having the most occurrence times as a subtitle region.

4. The method according to claim 1, wherein performing color enhancement processing on the contrasting extremal regions of the at least two channels, to form the color-enhanced contrasting extremal region includes:

determining a main color of each of the contrasting extremal regions of the at least two channels; and from the contrasting extremal regions of the at least two channels, extracting pixels whose similarity degree with the main color satisfy preset conditions, and forming the color-enhanced contrasting extremal regions of the at least two channels based on the extracted pixels.

5. The method according to claim 1, further comprising:

performing text recognition on the color-enhanced contrasting extremal regions as merged to generate recognized texts; and based on the recognized texts, performing at least one of video searching, video recommendation, video identifier classification, and subtitle sharing.

6. The method according to claim 1, wherein obtaining the difference value between the pixels of the adjacency regions is performed according to horizontal projection and vertical projection, the horizontal projection being a number of non-zero pixel values per text line, and the vertical projection being a number of non-zero pixel values in each column of image data.

7. The method according to claim 1, wherein extracting feature points from the adjacency regions via the scale-invariant feature transform (SIFT) algorithm includes:

extracting appearances of an object from the adjacency regions, the appearances of the object being independent of position or size or rotation of an image of the object.

8. The method according to claim 1, wherein extracting feature points from the adjacency regions via the scale-invariant feature transform (SIFT) algorithm includes:

extracting feature points from the adjacency regions, the feature points being independent of illumination or affine transformation or noise.

9. The method according to claim 1, further comprising:

in response to receiving a click operation by a user, identifying the same subtitle as a text format; and filling the same subtitle in a dialogue frame for sharing via instant messages.

10. The method according to claim 1, wherein the color enhancement is performed by:

sorting pixels included in the contrasting extremal regions according to corresponding grayscale values;

generating a set of sorted pixels having corresponding grayscale values greater than a predetermined threshold; and forming the color-enhanced contrasting extremal regions according to the set of sorted pixels.

11. The method according to claim 1, wherein a first pixel and a second pixel within each of the adjacency regions are connected to each other in a 4-adjacency type, in a D-adjacency type, or in an 8-adjaceny type, and wherein:

in the 4-adjacency type, the first pixel is p(x, y), the second pixel is a neighboring pixel (x+1, y), or a neighboring pixel (x−1,y), or a neighboring pixel (x, y+1), or a neighboring pixel (x, y−1);

in the D-adjacency type, the first pixel is p(x, y), the second pixel is a diagonal pixel (x+1, y+1), or a diagonal pixel (x+1, y−1), or a diagonal pixel (x−1, y+1), or a diagonal pixel (x−1, y−1); and in the 8-adjacency type, the first pixel is p(x, y), the second pixel is a neighboring pixel (x+1, y), or a neighboring pixel (x−1,y), or a neighboring pixel (x, y+1), or a neighboring pixel (x, y−1), or a diagonal pixel (x+1, y+1), or a diagonal pixel (x+1, y−1), or a diagonal pixel (x−1, y+1), or a diagonal pixel (x−1, y−1).

12. The method according to claim 1, wherein a first pixel and a second pixel within each of the adjacency regions are connected to each other in a mixed adjacency type, such that the first pixel is connected to the second pixel in a 4-adjacency type or in a D-adjacency type, and an intersection of the first pixel and the second pixel is empty of pixels with a grayscale value V, and wherein:

in the 4-adjacency type, the first pixel is p(x, y), the second pixel is a neighboring pixel (x+1, y), or a neighboring pixel (x−1,y), or a neighboring pixel (x, y+1), or a neighboring pixel (x, y−1); and in the D-adjacency type, the first pixel is p(x, y), the second pixel is a diagonal pixel (x+1, y+1), or a diagonal pixel (x+1, y−1), or a diagonal pixel (x−1, y+1), or a diagonal pixel (x−1, y−1).

13. A subtitle extraction device, comprising: a memory storing computer program instructions; and a processor coupled to the memory and, upon executing the computer program instructions, configured to perform:

decoding a video to obtain video frames;

performing adjacency operation in a subtitle arrangement direction on pixels in the video frames to obtain adjacency regions in the video frames;

determining certain video frames include a same subtitle based on the adjacency regions in the video frames, wherein the step of determining includes:

conducting a mode 1 of obtaining a difference value between pixels of the adjacency regions in the certain video frames;

conducting a mode 2 of extracting feature points from the adjacency regions in the certain video frames via a scale-invariant feature transform (SIFT) algorithm; and combining the mode 1 and the mode 2 such that upon determining the difference value between the pixels of the adjacency regions is less than a difference threshold, and that the feature points extracted from the adjacency regions are matched, determining the certain video frames include the same subtitle;

after determining the certain video frames include the same subtitle, superimposing subtitle regions of the certain video frames including the same subtitle and averaging the subtitle regions as superimposed to form a new subtitle region, wherein the subtitle regions are averaged to obtain a mean value as the new subtitle region;

constructing a component tree for at least two channels of the new subtitle region in the certain video frames, and using the constructed component tree to extract contrasting extremal regions respectively corresponding to the at least two channels, wherein the component tree includes a series of nodes nested in order from bottom to top, and an area-change-rate $R_{\Delta S}$ between a node (N, i) and an ancestor node (N, i+$\Delta$) is represented by formula $$R_{\Delta S}(n_i, n_{i+\Delta}) = \frac{Sn_{i+\Delta} - Sn_i}{Sn_i},$$

$Sn_i$ represents an area of the node (N, i), $Sn_{i+\Delta}$ represents an area of the ancestor node (N, i), and the contrasting extremal regions are extracted according to the area-change-rate $R_{\Delta S}$, wherein the node (N, i) and the ancestor node (N, i+$\Delta$) of the component tree correspond to characters of the new subtitle region, and upon determining the area-change-rate $R_{\Delta S}$ is less than an area-change rate threshold, the node (N, i) is determined to belong to the contrasting extremal regions of the at least two channels;

performing color enhancement processing on the contrasting extremal regions of the at least two channels to form color-enhanced contrasting extremal regions; and extracting the same subtitle by merging the color-enhanced contrasting extremal regions of the at least two channels.

14. The device according to claim 13, wherein the performing adjacency operation on the pixels in the video frames to obtain the adjacency regions in the video frames includes:

extracting the video frames at different time points according to a duration of the video;

performing eroding and dilation treatment on the video frames as extracted to obtain treated video frames; and performing leftward and rightward adjacency operations on the treated video frame to obtain the adjacency regions.

15. The device according to claim 13, wherein the determining the adjacency regions in the certain video frames including the same subtitle includes:

in each of the video frames including the same subtitle, determining occurrence times of different distribution positions of an edge region of an adjacency region, respectively, and determining that a region formed by a distribution position having the most occurrence times as a subtitle region.

16. The device according to claim 13, wherein performing color enhancement processing on the contrasting extremal regions of the at least two channels, to form the color-enhanced contrasting extremal region includes:

determining a main color of each of the contrasting extremal regions of the at least two channels; and from the contrasting extremal regions of the at least two channels, extracting pixels whose similarity degree with the main color satisfy preset conditions, and forming the color-enhanced contrasting extremal regions of the at least two channels based on the extracted pixels.

17. The device according to claim 13, wherein the processor is further configured to perform:

performing text recognition on the color-enhanced contrasting extremal regions as merged to generate recognized texts; and based on the recognized texts, performing at least one of video searching, video recommendation, video identifier classification, and subtitle sharing.

18. A non-transitory computer-readable storage medium storing computer program instructions executable by at least one processor to perform:

decoding a video to obtain video frames;

performing adjacency operation in a subtitle arrangement direction on pixels in the video frames to obtain adjacency regions in the video frames;

determining certain video frames include a same subtitle based on the adjacency regions in the video frames, wherein the step of determining includes:

conducting mode 1 of obtaining a difference value between pixels of the adjacency regions in the certain video frames;

conducting mode 2 of extracting feature points from the adjacency regions in the certain video frames via a scale-invariant feature transform (SIFT) algorithm; and combining the mode 1 and the mode 2 such that upon determining the difference value between the pixels of the adjacency regions is less than a difference threshold and that the feature points extracted from the adjacency regions are matched, determining the certain video frames include the same subtitle;

after determining the certain video frames include the same subtitle, superimposing subtitle regions of the certain video frames including the same subtitle and averaging the subtitle regions as superimposed to form a new subtitle region, wherein the subtitle regions are averaged to obtain a mean value as the new subtitle region;

constructing a component tree for at least two channels of the new subtitle region in the certain video frames, and using the constructed component tree to extract contrasting extremal regions respectively corresponding to the at least two channels, wherein the component tree includes a series of nodes nested in order from bottom to top, and an area-change-rate $R_{\Delta S}$ between a node (N, i) and an ancestor node (N, i+$\Delta$) is represented by formula $$R_{\Delta S}(n_i, n_{i+\Delta}) = \frac{Sn_{i+\Delta} - Sn_i}{Sn_i},$$

$Sn_i$ represents an area of the node (N, i), $Sn_{i+\Delta}$ represents an area of the ancestor node (N, i), and the contrasting extremal regions are extracted according to the area-change-rate $R_{AS}$, wherein the node (N, i) and the ancestor node (N, i+$\Delta$) of the component tree correspond to characters of the new subtitle region, and upon determining the area-change-rate $R_{AS}$ is less than an area-change rate threshold, the node (N, i) is determined to belong to the contrasting extremal regions of the at least two channels;

performing color enhancement processing on the contrasting extremal regions of the at least two channels to form color-enhanced contrasting extremal regions; and extracting the same subtitle by merging the color-enhanced contrasting extremal regions of the at least two channels.

19. The non-transitory computer-readable storage medium according to claim 18, wherein the performing adjacency operation on the pixels in the video frames to obtain the adjacency regions in the video frames includes:

extracting the video frames at different time points according to a duration of the video;

performing eroding and dilation treatment on the video frames as extracted to obtain treated video frames; and performing leftward and rightward adjacency operations on the treated video frame to obtain the adjacency regions.

\* \* \* \* \*